(12) United States Patent
Mirhosseini et al.

(10) Patent No.: US 11,734,867 B2
(45) Date of Patent: *Aug. 22, 2023

(54) DETECTING PHYSICAL BOUNDARIES

(71) Applicant: Apple Inc., Cupertino, CA (US)

(72) Inventors: Seyedkoosha Mirhosseini, Port Jefferson, NY (US); Avi Bar-Zeev, Oakland, CA (US); Duncan A. K. McRoberts, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 102 days.

This patent is subject to a terminal disclaimer.

(21) Appl. No.: 17/479,489

(22) Filed: Sep. 20, 2021

(65) Prior Publication Data

US 2022/0108508 A1 Apr. 7, 2022

Related U.S. Application Data

(63) Continuation of application No. 16/833,395, filed on Mar. 27, 2020, now Pat. No. 11,127,182, which is a continuation of application No. PCT/US2018/052719, filed on Sep. 25, 2018.

(60) Provisional application No. 62/631,048, filed on Feb. 15, 2018, provisional application No. 62/566,306, filed on Sep. 29, 2017.

(51) Int. Cl.
*G06T 11/60* (2006.01)
*G06T 7/292* (2017.01)
*G06T 7/246* (2017.01)
*G06F 3/01* (2006.01)

(52) U.S. Cl.
CPC .............. *G06T 11/60* (2013.01); *G06F 3/011* (2013.01); *G06T 7/246* (2017.01); *G06T 7/292* (2017.01)

(58) Field of Classification Search
CPC ......... G06T 11/60; G06T 7/292; G06T 7/246; G06F 3/011
See application file for complete search history.

(56) References Cited

U.S. PATENT DOCUMENTS

| 5,900,849 A | 5/1999 | Gallery |
| 9,754,167 B1 | 9/2017 | Holz et al. |
| 2012/0092328 A1 | 4/2012 | Flaks et al. |
| 2013/0031511 A1 | 1/2013 | Adachi |
| 2013/0293386 A1* | 11/2013 | Raniere ................. G08B 21/24 340/686.6 |
| 2013/0335301 A1 | 12/2013 | Wong et al. |
| 2014/0267248 A1 | 9/2014 | Zou et al. |
| 2014/0364212 A1 | 12/2014 | Osman et al. |
| 2015/0277119 A1 | 10/2015 | Wong et al. |

(Continued)

FOREIGN PATENT DOCUMENTS

| CN | 106295581 A | 1/2017 |
| CN | 106575155 A | 4/2017 |

(Continued)

OTHER PUBLICATIONS

Applicant-Initiated Interview Summary received for U.S. Appl. No. 17/002,225, dated Jun. 29, 2021, 2 pages.

(Continued)

*Primary Examiner* — Michelle Chin
(74) *Attorney, Agent, or Firm* — DLA Piper LLP (US)

(57) ABSTRACT

Techniques for alerting a user, who is immersed in a virtual reality environment, to physical obstacles in their physical environment are disclosed.

17 Claims, 19 Drawing Sheets

(56) References Cited

U.S. PATENT DOCUMENTS

| | | |
|---|---|---|
| 2016/0027212 A1 | 1/2016 | Da Veiga et al. |
| 2016/0027215 A1 | 1/2016 | Burns et al. |
| 2016/0217616 A1 | 7/2016 | Kraver |
| 2016/0379413 A1 | 12/2016 | Yamamoto et al. |
| 2017/0061696 A1 | 3/2017 | Li et al. |
| 2017/0169616 A1 | 6/2017 | Wiley et al. |
| 2017/0206692 A1 | 7/2017 | Sheaffer et al. |
| 2017/0287215 A1 | 10/2017 | Lalonde et al. |
| 2017/0337750 A1* | 11/2017 | McKenzie ............ G06T 19/006 |
| 2018/0122043 A1 | 5/2018 | Energin et al. |
| 2018/0165883 A1 | 6/2018 | Osotio et al. |
| 2018/0342103 A1 | 11/2018 | Schwarz et al. |
| 2019/0213793 A1 | 7/2019 | Balan et al. |
| 2019/0333278 A1 | 10/2019 | Palangie et al. |
| 2020/0258278 A1 | 8/2020 | Mirhosseini et al. |
| 2021/0018977 A1 | 1/2021 | Baumbach et al. |
| 2021/0097766 A1 | 4/2021 | Palangie et al. |

FOREIGN PATENT DOCUMENTS

| | | |
|---|---|---|
| CN | 107850936 A | 3/2018 |
| JP | 1-504917 A | 5/1998 |
| JP | 2011-128838 A | 6/2011 |
| JP | 2015-191124 A | 11/2015 |
| JP | 2016-532178 A | 10/2016 |
| JP | 2019-516180 A | 6/2019 |
| KR | 10-2017-0081225 A | 7/2017 |
| WO | 2013/052855 A2 | 4/2013 |
| WO | 2014/197337 A1 | 12/2014 |
| WO | 2016/073783 A1 | 5/2016 |
| WO | 2018/004735 A1 | 1/2018 |

OTHER PUBLICATIONS

Final Office Action received for U.S. Appl. No. 17/002,225, dated Aug. 6, 2021, 19 pages.
Applicant-Initiated Interview Summary received for U.S. Appl. No. 16/833,395, dated Mar. 1, 2021, 5 pages.
International Preliminary Report on Patentability received for PCT Patent Application No. PCT/US2018/052719, dated Apr. 9, 2020, 10 pages.
International Search Report and Written Opinion Received for PCT Application No. PCT/US2018/052719, dated Jan. 2, 2019, 11 pages.
Non-Final Office Action received for U.S. Appl. No. 16/833,395, dated Oct. 16, 2020, 21 pages.
Non-Final Office Action received for U.S. Appl. No. 17/002,225, dated Mar. 12, 2021, 17 pages.
Notice of Allowance received for U.S. Appl. No. 16/833,395, dated Jun. 23, 2021, 8 pages.
Notice of Allowance received for U.S. Appl. No. 16/833,395, dated May 19, 2021, 11 pages.
Office Action received for Japanese Patent Application No. 2020-517779, dated May 10, 2021, 7 pages.
Notice of Allowance received for Korean Patent Application No. 10-2020-7008974, dated Oct. 12, 2022, 4 pages (1 pages of English Translation and 3 pages of Official Copy).
Office Action received for Korean Patent Application No. 10-2020-7008974, dated Jun. 21, 2022, 6 pages (3 pages of English Translation and 3 pages of Official Copy).
Applicant-Initiated Interview Summary received for U.S. Appl. No. 17/002,225, dated Feb. 25, 2022, 2 pages.
Applicant-Initiated Interview Summary received for U.S. Appl. No. 17/002,225, dated Oct. 25, 2021, 2 pages.
Decision to Grant received for Japanese Patent Application No. 2020-517779, dated Jan. 19, 2022, 7 pages (5 pages of English Translation and 2 pages of Official Copy).
Final Office Action received for U.S. Appl. No. 17/002,225, dated May 2, 2022, 23 pages.
Non-Final Office Action received for U.S. Appl. No. 17/002,225, dated Dec. 8, 2021, 21 pages.
Notice of Allowance received for Chinese Patent Application No. 201880063520.30, dated Apr. 12, 2022, 2 pages (1 page of English Translation and 1 page of Official Copy).
Office Action received for Chinese Patent Application No. 201880063520.3, dated Aug. 26, 2021, 14 pages (5 pages of English Translation and 9 pages of Official Copy).
Office Action received for European Patent Application No. 18793511.9, dated Dec. 13, 2021, 7 pages.
Office Action received for Korean Patent Application No. 10-2020-7008974, dated Nov. 29, 2021, 8 pages (4 pages of English Translation and 4 pages of Official Copy).
106295581, CN, A, Cited by the Chinese Patent Office in an Office Action for related Patent Application No. 201880063520.3 dated Aug. 26, 2021.

* cited by examiner

DETECTING PHYSICAL BOUNDARIES

CROSS-REFERENCE TO RELATED APPLICATIONS

This application is a continuation of U.S. patent application Ser. No. 16/833,395, entitled "DETECTING PHYSICAL BOUNDARIES," filed Mar. 27, 2020, which is a continuation of PCT patent application PCT/US2018/052719, entitled "PHYSICAL BOUNDARY GUARDIAN," filed on Sep. 25, 2018, which claims priority to U.S. provisional patent application No. 62/631,048, entitled "PHYSICAL BOUNDARY GUARDIAN," filed on Feb. 15, 2018, and U.S. provisional patent application No. 62/566,306, entitled "PHYSICAL BOUNDARY GUARDIAN," filed on Sep. 29, 2017. The content of these applications is hereby incorporated by reference in its entirety for all purposes.

BACKGROUND

The present disclosure relates generally to computer simulated reality interfaces, and more specifically to techniques for indicating physical obstacles in a virtual reality environment.

A virtual reality device immerses a user in a virtual environment. A user may become so immersed in a virtual environment that, while moving about the virtual environment, the user collides with adjacent physical objects in the physical environment. For example, while wearing a virtual reality head mounted device, a user may move about a large (virtual) room in virtual reality, but in the process, collide with a physical wall of the physical room in which the user is physically located.

BRIEF SUMMARY

The present disclosure describes techniques for indicating physical obstacles that are in a user's immediate physical environment while the user is immersed in a virtual reality environment. In one exemplary embodiment, a virtual reality environment is displayed. A distance between the electronic device and a physical object is determined. Further, whether the distance between the electronic device and a physical object is within a first threshold distance is determined. In accordance with a determination that the distance is within the first threshold distance, a visual effect in the virtual reality environment is displayed. Further, whether the distance between the electronic device and the physical object is within the second threshold distance is determined. In accordance with a determination that the distance is within a second threshold distance, a visual representation of at least part of a physical environment is displayed. The visual representation is provided by the one or more cameras.

In one exemplary embodiment, while a virtual reality environment is displayed on a display of the electronic device, a distance between the electronic device and a physical object of a physical environment is determined. Further, whether the distance between the electronic device and the physical object of the physical environment is within a threshold distance is determined. The virtual reality environment has a surface representing a ground surface. In accordance with a determination that the distance is within the threshold distance, a visual effect is displayed in the virtual reality environment. The visual effect corresponds to the distance associated with the physical object. Further, the visual effect is disposed on the virtual ground surface of the virtual reality environment.

In one exemplary embodiment, a non-transitory computer-readable storage medium storing one or more programs configured to be executed by one or more processors of an electronic device is provided. The one or more programs include instructions for displaying a virtual reality environment and determining a distance between the electronic device and a physical object. The one or more programs include further instructions for determining whether the distance between the electronic device and a physical object is within a first threshold distance. The one or more programs include further instructions for displaying a visual effect in the virtual reality environment in accordance with a determination that the distance is within the first threshold distance. The one or more programs include further instructions for determining whether the distance between the electronic device and the physical object is within a second threshold distance; and in accordance with a determination that the distance is within the second threshold distance, displaying a visual representation of at least part of a physical environment. The visual representation is provided by the one or more cameras.

In one exemplary embodiment, an electronic device is provided. The electronic device includes one or more processors and memory storing one or more programs configured to be executed by the one or more processors. The one or more programs include instructions for displaying a virtual reality environment and determining a distance between the electronic device and a physical object. The one or more programs include further instructions for determining whether the distance between the electronic device and the physical object is within a first threshold distance. The one or more programs include further instructions for displaying a visual effect in the virtual reality environment in accordance with a determination that the distance is within the first threshold distance. The one or more programs include further instructions for determining whether the distance between the electronic device and the physical object in the physical environment is within a second threshold distance; and in accordance with a determination that the distance is within the second threshold distance, displaying a visual representation of at least part of the physical environment. The visual representation is provided by the one or more cameras.

In one exemplary embodiment, an electronic device is provided. The electronic device includes means for displaying a virtual reality environment and means for determining a distance between the electronic device and a physical object. The electronic device further includes means for determining whether the distance between the electronic device and the physical object is within a first threshold distance. The electronic device further includes, in accordance with a determination that the distance is within the first threshold distance, means for displaying a visual effect in the virtual reality environment. The electronic device further includes means for determining whether the distance between the electronic device and the physical object is within a second threshold distance; and in accordance with a determination that the distance is within the second threshold distance, means for displaying a visual representation of at least part of a physical environment. The visual representation is provided by the one or more cameras.

In one exemplary embodiment, a non-transitory computer-readable storage medium storing one or more programs configured to be executed by one or more processors of an electronic device is provided. The one or more programs include instructions for while displaying a virtual reality environment on a display of the electronic device, the virtual reality environment having a surface representing a ground surface, determining a distance between the electronic device and a physical object of a physical environment. The one or more programs includes further instructions for determining whether the distance between the electronic device and the physical object of the physical environment is within a threshold distance. The one or more programs includes further instructions for, in accordance with a determination that the distance is within the threshold distance, displaying a visual effect in the virtual reality environment. The visual effect corresponds to the distance associated with the physical object, and the visual effect is disposed on the ground surface of the virtual reality environment.

In one exemplary embodiment, an electronic device includes one or more processors and memory storing one or more programs configured to be executed by the one or more processors. The one or more programs include instructions for, while displaying a virtual reality environment on a display of the electronic device, the virtual reality environment having a surface representing a ground surface, determining a distance between the electronic device and a physical object of a physical environment. The one or more programs include further instructions for determining whether the distance between the electronic device and the physical object of the physical environment is within a threshold distance. The one or more programs include further instructions for, in accordance with a determination that the distance is within the threshold distance, displaying a visual effect in the virtual reality environment. The visual effect corresponds to the distance associated with the physical object, and the visual effect is disposed on the ground surface of the virtual reality environment.

In one exemplary embodiment, an electronic device is provided. The electronic device includes, while displaying a virtual reality environment on a display of the electronic device, the virtual reality environment having a surface representing a ground surface, means for determining a distance between the electronic device and a physical object of a physical environment. The electronic device further includes means for determining whether the distance between the electronic device and the physical object of the physical environment is within a threshold distance. The electronic device further includes, in accordance with a determination that the distance is within the threshold distance, means for displaying a visual effect in the virtual reality environment. The visual effect corresponds to the distance associated with the physical object, and the visual effect is disposed on the ground surface of the virtual reality environment.

DETAILED DESCRIPTION

Figure 1A:
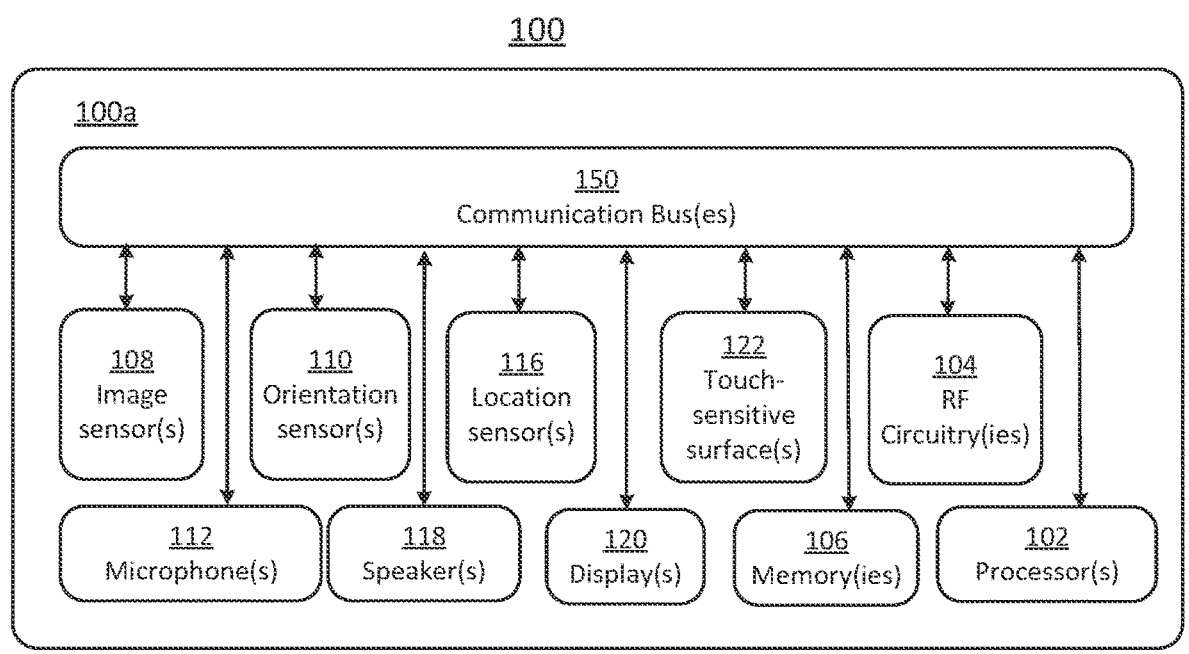
FIGS. 1A-1B depict exemplary systems for use in various computer simulated reality technologies, including virtual reality and mixed reality.

Various embodiments of electronic systems and techniques for using such systems in relation to various simulated reality technologies, including virtual reality and mixed reality (which incorporates sensory inputs from a physical setting), are described.

A physical setting refers to a world that individuals can sense and/or with which individuals can interact without assistance of electronic systems. Physical settings (e.g., a physical forest) include physical elements (e.g., physical trees, physical structures, and physical animals). Individuals can directly interact with and/or sense the physical setting, such as through touch, sight, smell, hearing, and taste. A physical setting may also be referred to as a physical environment or a real environment. A physical element may also be referred to as a physical object or a physical article.

In contrast, a simulated reality (SR) setting refers to an entirely or partly computer-created setting that individuals can sense and/or with which individuals can interact via an electronic system. In SR, a subset of an individual's movements is monitored, and, responsive thereto, one or more attributes of one or more virtual objects in the SR setting is changed in a manner that conforms with one or more physical laws. For example, a SR system may detect an individual walking a few paces forward and, responsive thereto, adjust graphics and audio presented to the individual in a manner similar to how such scenery and sounds would change in a physical setting. Modifications to attribute(s) of virtual object(s) in a SR setting also may be made responsive to representations of movement (e.g., audio instructions).

An individual may interact with and/or sense a SR object using any one of his senses, including touch, smell, sight, taste, and sound. For example, an individual may interact with and/or sense aural objects that create a multi-dimensional (e.g., three dimensional) or spatial aural setting, and/or enable aural transparency. Multi-dimensional or spatial aural settings provide an individual with a perception of discrete aural sources in multi-dimensional space. Aural transparency selectively incorporates sounds from the physical setting, either with or without computer-created audio. In some SR settings, an individual may interact with and/or sense only aural objects.

One example of SR is virtual reality (VR). A VR setting refers to a simulated setting that is designed only to include computer-created sensory inputs for at least one of the senses. A VR setting includes multiple virtual objects with which an individual may interact and/or sense. An individual may interact and/or sense virtual objects in the VR setting through a simulation of a subset of the individual's actions within the computer-created setting, and/or through a simulation of the individual or his presence within the computer-created setting.

Another example of SR is mixed reality (MR). A MR setting refers to a simulated setting that is designed to integrate computer-created sensory inputs (e.g., virtual objects) with sensory inputs from the physical setting, or a representation thereof. On a reality spectrum, a mixed reality setting is between, and does not include, a VR setting at one end and an entirely physical setting at the other end.

In some MR settings, computer-created sensory inputs may adapt to changes in sensory inputs from the physical setting. Also, some electronic systems for presenting MR settings may monitor orientation and/or location with respect to the physical setting to enable interaction between virtual objects and real objects (which are physical elements from the physical setting or representations thereof). For example, a system may monitor movements so that a virtual plant appears stationary with respect to a physical building.

One example of mixed reality is augmented reality (AR). An AR setting refers to a simulated setting in which at least one virtual object is superimposed over a physical setting, or a representation thereof. For example, an electronic system may have an opaque display and at least one imaging sensor for capturing images or video of the physical setting, which are representations of the physical setting. The system combines the images or video with virtual objects, and displays the combination on the opaque display. An individual, using the system, views the physical setting indirectly via the images or video of the physical setting, and observes the virtual objects superimposed over the physical setting. When a system uses image sensor(s) to capture images of the physical setting, and presents the AR setting on the opaque display using those images, the displayed images are called a video pass-through. Alternatively, an electronic system for displaying an AR setting may have a transparent or semi-transparent display through which an individual may view the physical setting directly. The system may display virtual objects on the transparent or semi-transparent display, so that an individual, using the system, observes the virtual objects superimposed over the physical setting. In another example, a system may comprise a projection system that projects virtual objects into the physical setting. The virtual objects may be projected, for example, on a physical surface or as a holograph, so that an individual, using the system, observes the virtual objects superimposed over the physical setting.

An augmented reality setting also may refer to a simulated setting in which a representation of a physical setting is altered by computer-created sensory information. For example, a portion of a representation of a physical setting may be graphically altered (e.g., enlarged), such that the altered portion may still be representative of but not a faithfully-reproduced version of the originally captured image(s). As another example, in providing video pass-through, a system may alter at least one of the sensor images to impose a particular viewpoint different than the viewpoint captured by the image sensor(s). As an additional example, a representation of a physical setting may be altered by graphically obscuring or excluding portions thereof.

Another example of mixed reality is augmented virtuality (AV). An AV setting refers to a simulated setting in which a computer-created or virtual setting incorporates at least one sensory input from the physical setting. The sensory input(s) from the physical setting may be representations of at least one characteristic of the physical setting. For example, a virtual object may assume a color of a physical element captured by imaging sensor(s). In another example, a virtual object may exhibit characteristics consistent with actual weather conditions in the physical setting, as identified via imaging, weather-related sensors, and/or online weather data. In yet another example, an augmented reality forest may have virtual trees and structures, but the animals may have features that are accurately reproduced from images taken of physical animals.

Many electronic systems enable an individual to interact with and/or sense various SR settings. One example includes head mounted systems. A head mounted system may have an opaque display and speaker(s). Alternatively, a head mounted system may be designed to receive an external display (e.g., a smartphone). The head mounted system may have imaging sensor(s) and/or microphones for taking images/video and/or capturing audio of the physical setting, respectively. A head mounted system also may have a transparent or semi-transparent display. The transparent or semi-transparent display may incorporate a substrate through which light representative of images is directed to an individual's eyes. The display may incorporate LEDs, OLEDs, a digital light projector, a laser scanning light source, liquid crystal on silicon, or any combination of these technologies. The substrate through which the light is transmitted may be a light waveguide, optical combiner, optical reflector, holographic substrate, or any combination of these substrates. In one embodiment, the transparent or semi-transparent display may transition selectively between an opaque state and a transparent or semi-transparent state. In another example, the electronic system may be a projection-based system. A projection-based system may use retinal projection to project images onto an individual's retina. Alternatively, a projection system also may project virtual objects into a physical setting (e.g., onto a physical surface or as a holograph). Other examples of SR systems include heads up displays, automotive windshields with the ability to display graphics, windows with the ability to display graphics, lenses with the ability to display graphics, headphones or earphones, speaker arrangements, input mechanisms (e.g., controllers having or not having haptic feedback), tablets, smartphones, and desktop or laptop computers.

One challenge in computer simulated reality is that, while interacting with the virtual objects displayed by a head-mounted device, the user may be so immersed in the virtual reality environment that he or she lose awareness of the physical obstacles and/or boundaries in their physical vicinity. The head-mounted device can be opaque and cover both eyes of the user in some embodiments. Therefore, the user may not be able to see (e.g., directly see) the physical environment of the user. Thus, it is desirable for the user device to provide indications to the user to help avoid physical obstacles and/or navigate around them. Further, it is desirable for the user device to provide these indications in a manner that does not significantly impact the user's virtual reality experience.

In accordance with some embodiments described herein, while a virtual reality environment is displayed to the user, a virtual reality device determines a distance between the device and a physical object of a physical environment. The virtual reality device further determines whether the device has come within a (first) threshold distance to a physical object of a physical environment. If the device determines it is too close to the physical object, the device displays a visual effect in the virtual reality environment alerting the user to the presence of a nearby physical obstacle. The visual effect corresponds to the distance associated with the physical object and includes, for example, one or more virtual objects. In some examples, the visual effect has the appearance of a glass pane, to represent a nearby physical wall with which the user might collide if the user continues to move forward. Other examples are discussed below. The virtual reality device thus alerts the user to nearby physical objects. If the user continues to move towards the physical object, such that the virtual reality device comes even closer to the physical object (within a second threshold distance) despite the visual effects, the device displays a live image or video of the physical environment. In this way, the user is provided with a pass-through visual to the physical environment such that the user can see the exact physical obstacle without removing the head-mounted virtual reality device.

Figure 1B:
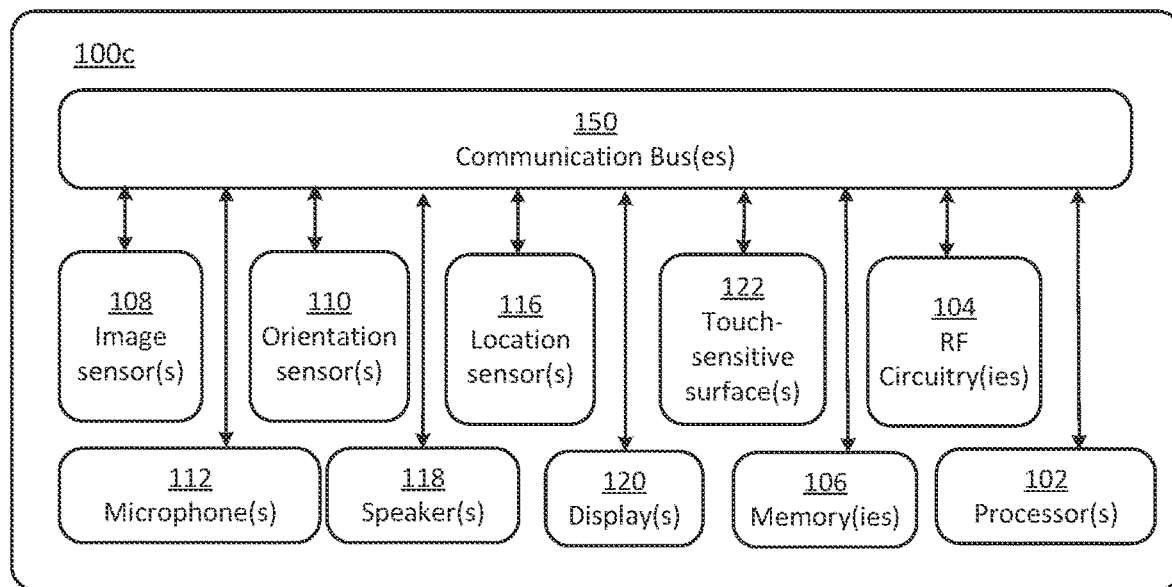
Figure 1B:
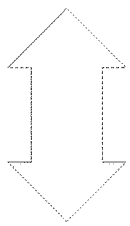
Figure 1B:
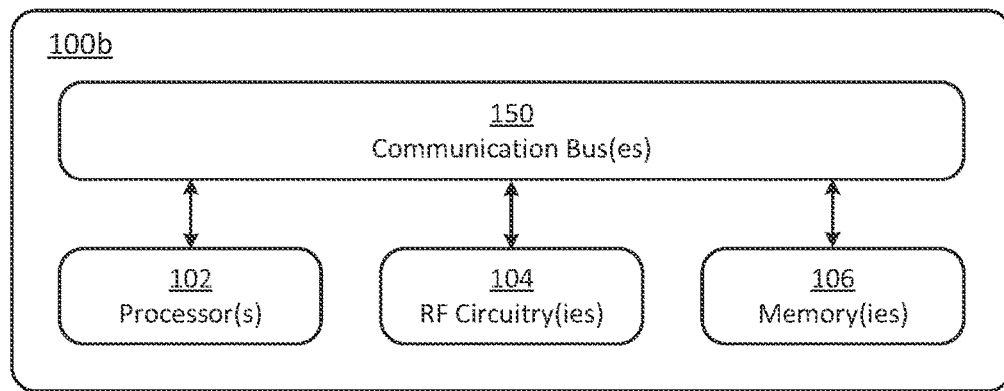

FIG. 1A and FIG. 1B depict exemplary system 100 for use in various simulated reality technologies, including virtual reality and mixed reality.

In some embodiments, as illustrated in FIG. 1A, system 100 includes device 100a. Device 100a includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100a.

In some embodiments, elements of system 100 are implemented in a base station device (e.g., a computing device, such as a remote server, mobile device, or laptop) and other elements of the system 100 are implemented in a second device (e.g., a head-mounted device). In some examples, device 100a is implemented in a base station device or a second device.

As illustrated in FIG. 1B, in some embodiments, system 100 includes two (or more) devices in communication, such as through a wired connection or a wireless connection. First device 100b (e.g., a base station device) includes processor(s) 102, RF circuitry(ies) 104, and memory(ies) 106. These components optionally communicate over communication bus(es) 150 of device 100b. Second device 100c (e.g., a head-mounted device) includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100c.

System 100 includes processor(s) 102 and memory(ies) 106. Processor(s) 102 include one or more general processors, one or more graphics processors, and/or one or more digital signal processors. In some embodiments, memory(ies) 106 are one or more non-transitory computer-readable storage mediums (e.g., flash memory, random access memory) that store computer-readable instructions configured to be executed by processor(s) 102 to perform the techniques described below.

System 100 includes RF circuitry(ies) 104. RF circuitry(ies) 104 optionally include circuitry for communicating with electronic devices, networks, such as the Internet, intranets, and/or a wireless network, such as cellular networks and wireless local area networks (LANs). RF circuitry(ies) 104 optionally includes circuitry for communicating using near-field communication and/or short-range communication, such as Bluetooth®.

System 100 includes display(s) 120. Display(s) 120 may have an opaque display. Display(s) 120 may have a transparent or semi-transparent display that may incorporate a substrate through which light representative of images is directed to an individual's eyes. Display(s) 120 may incorporate LEDs, OLEDs, a digital light projector, a laser scanning light source, liquid crystal on silicon, or any combination of these technologies. The substrate through which the light is transmitted may be a light waveguide, optical combiner, optical reflector, holographic substrate, or any combination of these substrates. In one embodiment, the transparent or semi-transparent display may transition selectively between an opaque state and a transparent or semi-transparent state. Other examples of display(s) 120 include heads up displays, automotive windshields with the ability to display graphics, windows with the ability to display graphics, lenses with the ability to display graphics, tablets, smartphones, and desktop or laptop computers. Alternatively, system 100 may be designed to receive an external display (e.g., a smartphone). In some embodiments, system 100 is a projection-based system that uses retinal projection to project images onto an individual's retina or projects virtual objects into a physical setting (e.g., onto a physical surface or as a holograph).

In some embodiments, system 100 includes touch-sensitive surface(s) 122 for receiving user inputs, such as tap inputs and swipe inputs. In some examples, display(s) 120 and touch-sensitive surface(s) 122 form touch-sensitive display(s).

System 100 includes image sensor(s) 108. Image sensors(s) 108 optionally include one or more visible light image sensor, such as charged coupled device (CCD) sensors, and/or complementary metal-oxide-semiconductor (CMOS) sensors operable to obtain images of physical elements from the physical setting. Image sensor(s) also optionally include one or more infrared (IR) sensor(s), such as a passive IR sensor or an active IR sensor, for detecting infrared light from the physical setting. For example, an active IR sensor includes an IR emitter, such as an IR dot emitter, for emitting infrared light into the physical setting. Image sensor(s) 108 also optionally include one or more event camera(s) configured to capture movement of physical elements in the physical setting. Image sensor(s) 108 also optionally include one or more depth sensor(s) configured to detect the distance of physical elements from system 100. In some examples, system 100 uses CCD sensors, event cameras, and depth sensors in combination to detect the physical setting around system 100. In some examples, image sensor(s) 108 include a first image sensor and a second image sensor. The first image sensor and the second image sensor are optionally configured to capture images of physical elements in the physical setting from two distinct perspectives. In some examples, system 100 uses image sensor(s) 108 to receive user inputs, such as hand gestures. In some examples, system 100 uses image sensor(s) 108 to detect the position and orientation of system 100 and/or display(s) 120 in the physical setting. For example, system 100 uses image sensor(s) 108 to track the position and orientation of display(s) 120 relative to one or more fixed elements in the physical setting.

In some embodiments, system 100 includes microphones(s) 112. System 100 uses microphone(s) 112 to detect sound from the user and/or the physical setting of the user. In some examples, microphone(s) 112 includes an array of microphones (including a plurality of microphones) that optionally operate in tandem, such as to identify ambient noise or to locate the source of sound in space of the physical setting.

System 100 includes orientation sensor(s) 110 for detecting orientation and/or movement of system 100 and/or display(s) 120. For example, system 100 uses orientation sensor(s) 110 to track changes in the position and/or orientation of system 100 and/or display(s) 120, such as with respect to physical elements in the physical setting. Orientation sensor(s) 110 optionally include one or more gyroscopes and/or one or more accelerometers.

Turning now to FIGS. 2, 3A-3D, 4A-4E, 5A-5C, and 6A-6B, exemplary electronic devices and user interfaces for indicating physical obstacles while displaying a virtual reality environment on an electronic device (e.g., 100a), in accordance with some embodiments, are described. The figures are used to illustrate the processes described below, including the processes in FIGS. 7A and 7B.

Figure 2:
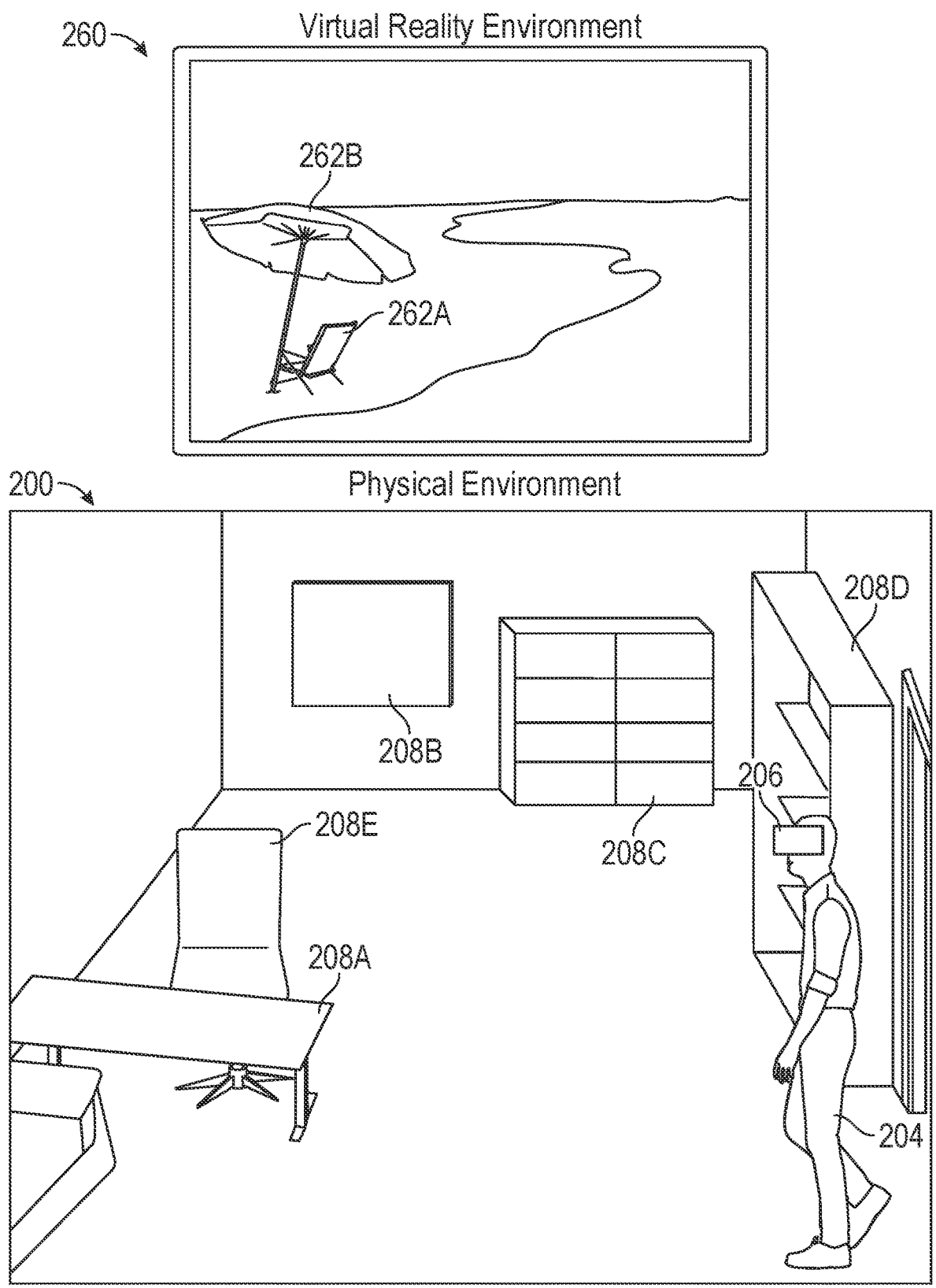
FIG. 2 depicts an exemplary physical environment within which a user device is disposed and an exemplary virtual reality environment is displayed by the user device.

FIG. 2 depicts an exemplary physical environment 200 within which a user device 206 is disposed and an exemplary virtual reality environment 260 displayed by user device 206. In the present embodiment, user device 206 is a standalone device, such as a hand-held mobile device (e.g., a smartphone), or a standalone head-mounted device. It should be recognized that, in other embodiments, user device 206 can be communicatively coupled to another device, such as a base station device (e.g., base station device 100b). In these embodiments, the operations described below for indicating physical obstacles in a computer simulated reality environment can be divided up in any manner between user device 206 and the other device. For example, an electronic device that performs any of the method or process described in this application can be a combination of user device 206 and a base station device 100b.

FIG. 2 illustrates an embodiment in which user device 206 is used as a head-mounted device. In some embodiments, a head-mounted device is opaque and covers both eyes of a user 204. Therefore, in some instances, user 204 wearing user device 206 cannot directly see physical objects in physical environment 200. User device 206 can also obtain images and videos using one or more cameras. A camera can be, for example, a digital camera (e.g., a charge-coupled device (CCD) type camera) that captures digital images or videos. A camera can be an event camera, such as a dynamic vision sensor (DVS) camera. In some embodiments, an event camera outputs a stream of asynchronous spikes, each with pixel location, sign, and precise timing, indicating when individual pixels record a threshold intensity (e.g., log intensity) change. For example, an event camera can be triggered by a change in the physical environment (e.g., a new physical object such as a person enters a room, etc.).

With reference to FIG. 2, in some embodiments, physical environment 200 is an indoor environment, such as a room including one or more physical objects 208A-E (collectively physical objects 208). A physical object in a physical environment can include, for example, a wall, a table, a chair, a window, a person, an animal, a plant, etc.

In some embodiments, user device 206 can be moved with respect to the physical objects disposed in physical environment 200. For instance, as user 204 moves relative to (e.g., toward) physical objects 208A and 208E, user device 206 is also moved relative to physical objects 208A and 208E. In some embodiments, user device 206 can be configured to determine whether it is moving toward a physical object in physical environment 200. User device 206 can be configured to make such determination using one or more cameras and/or depth sensors of the user device 206. For example, using a plurality of cameras (e.g., digital cameras, infrared cameras), user device 206 can determine a distance between user device 206 and one or more of the physical objects in physical environment 200. As one example, the distance is determined based on the discrepancies of the 3D perception captured by two or more cameras of user device 206. As another example, a depth sensor (e.g., a 3D time-of-flight sensor) is used to estimate the distance between each of the physical objects in physical environment 200 and user device 206. A depth sensor may be, for example, a LiDAR sensor.

With reference to FIG. 2, user device 206 displays an exemplary virtual reality environment 260 (e.g., a virtual outdoor environment depicting a beach). In some embodiments, virtual reality environment 260 displayed by user device 206 can be varied in response to the moving of user device 206 in the physical environment 200. For example, objects in virtual reality environment 260 (e.g., a virtual beach chair 262A and a virtual beach umbrella 262B) may appear to be closer/farther to user 204 as user 204 moves forward or backward with user device 206. As another example, the objects in the images/videos displayed in virtual reality environment 260 can change their positions/angles with respect to user 204's point of view as user 204 moves his or her head to the left or right with user device 206.

Figure 3A:
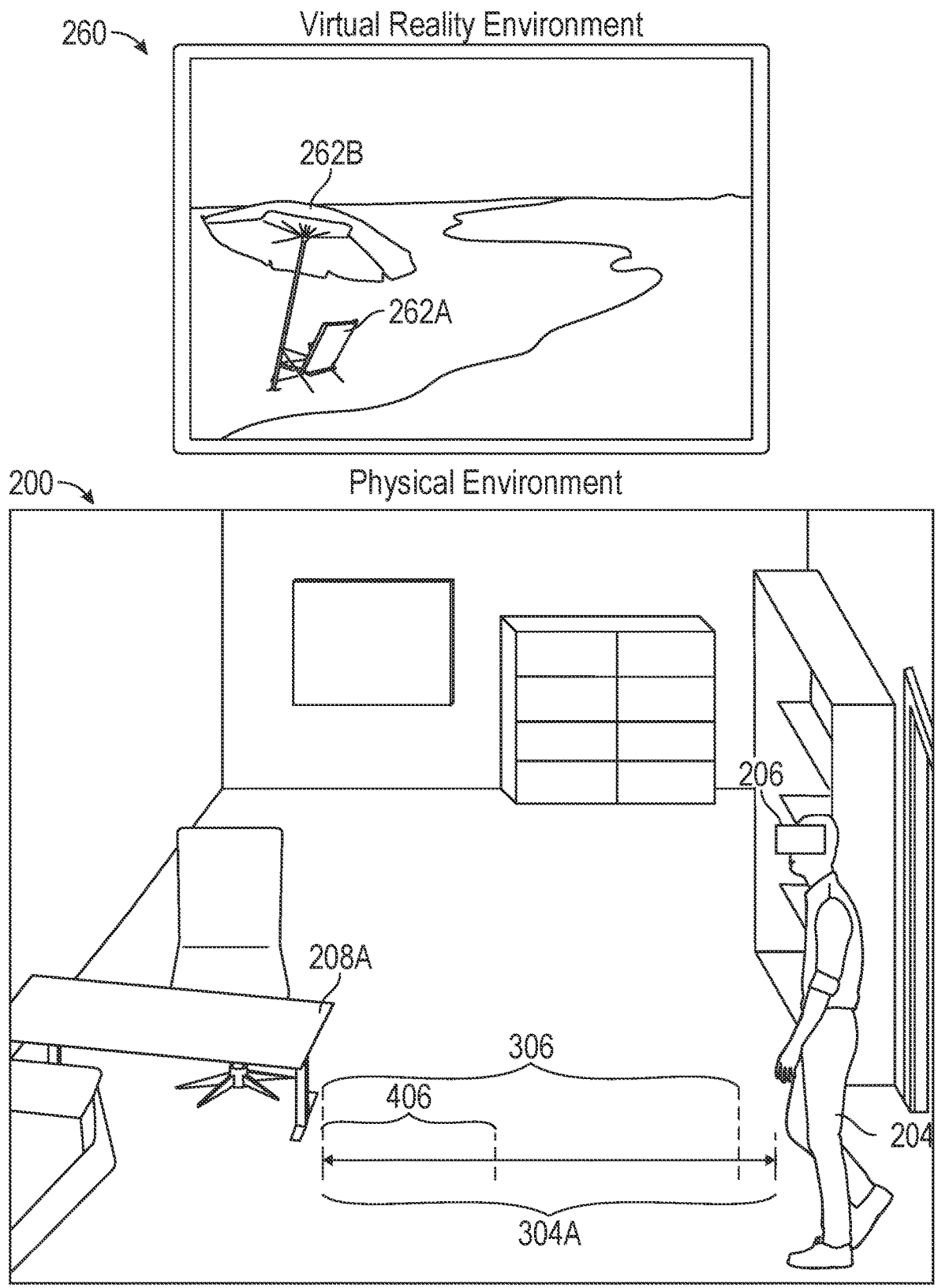
FIG. 3A depicts a user device positioned at a distance from the physical objects greater than a first threshold distance and the corresponding exemplary virtual reality environment displayed by the user device.

With reference to FIG. 3A, during operation, user device 206 monitors the variation of distances between user device 206 and one or more particular physical objects in physical environment 200 and determines whether it is moving relative to the one or more physical objects. For example, with reference to FIG. 3A, if the distance between physical object 208A (e.g., a computer desk) and user device 206 is determined to be decreasing, not changing, or increasing, user device 206 is configured to determine that it is moving toward, not moving (stationary), or moving away from physical object 208A, respectively.

In some embodiments, if user device 206 is determined to be moving toward physical object 208A, user device 206 can be further configured to determine whether a distance 304A between user device 206 and physical object 208A is less than or equal to a first threshold distance 306. If user device 206 is determined to be not moving or moving away from physical object 208A, user device 206 continues to monitor movement of user device 206. For example, user 204 may be sitting or standing in front of physical object 208A, and in response, user device 206 may determine that it is not moving. Accordingly, while the distance between user device 206 and physical object 208A may be less than first threshold distance 306 and therefore within the first threshold distance, there is no immediate need for providing visual effects corresponding to physical object 208A to user 204 because user 204 may not need to be made aware of physical object 208A (e.g., there is no risk of a collision between user 204 and physical object 208A). Under these circumstances, user device 206 continues to monitor movement while continuing to display a virtual reality environment 260 to user 204.

As described above, user device 206 can be configured to determine a distance between the user device 206 and each of the physical objects (e.g., objects 208A-E shown in FIG. 2) in physical environment 200, for instance, using at least one of a depth sensor or a plurality of cameras. Thus, user device 206 can determine a distance 304A between the user device 206 and physical object 208A and compare the determined distance 304A with first threshold distance 306. First threshold distance 306 represents a distance at which one or more visual effects corresponding to one or more physical objects (e.g., objects 208A and 208E) are to be displayed in virtual environment 260 to user 204 such that user 204 is made aware of the physical object. First threshold distance 306 may be configured to be, for example, 3 to 5 feet.

With reference to FIG. 3A, user device 206 can determine whether distance 304A between user device 206 and physical object 208A is less than or equal to a first threshold distance 306. As shown in FIG. 3A, in some embodiments, user device 206 determines that distance 304 is greater than first threshold distance 306, indicating that user 204 does not need to be made aware of physical object 208A because user device 206 is still far away from physical object 208A. As such, user device 206 continues to display virtual reality environment 260 without displaying any visual effect or image/video of the physical object 208A.

Figure 3B:
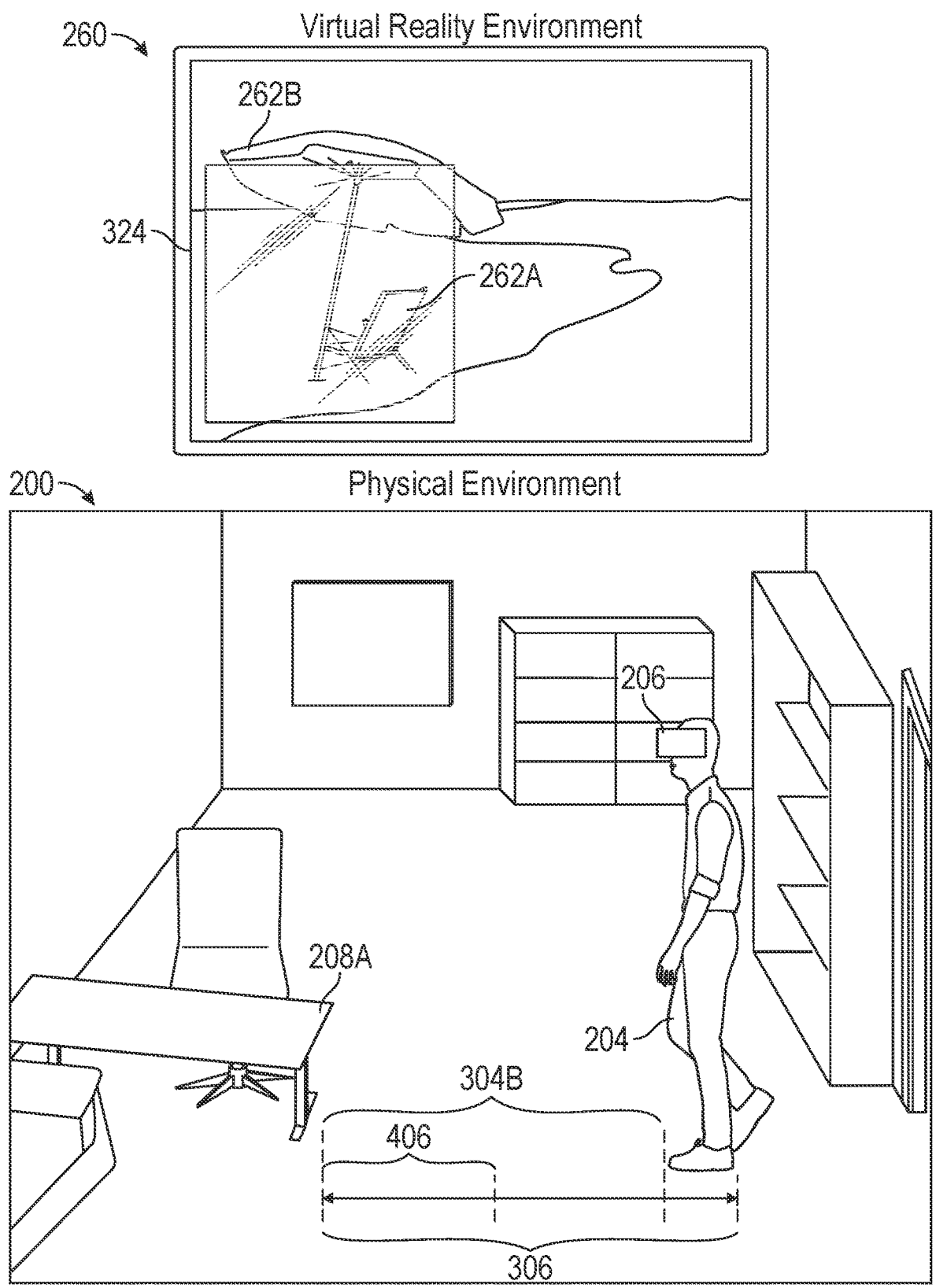
FIG. 3B depicts a user device positioned at a distance within the first threshold distance and an exemplary virtual indication displayed in the corresponding virtual reality environment.

FIG. 3B depicts a user device 206 positioned at a distance 304B within the first threshold distance 306 and an exemplary virtual indication 324 displayed in the corresponding virtual reality environment 260. With reference to FIG. 3B, user device 206 may be continuously moved toward physical object 208A as user 204 walks closer to physical object 208A. User device 206 determines whether distance 304B between user device 206 and physical object 208A of physical environment 200 is less than or equal to first threshold distance 306. If so, user device 206 determines that distance 304B is within the first threshold distance. While FIG. 3A illustrates an embodiment that uses first threshold distance 306 as a first threshold condition for determining whether a visual effect should be displayed to make the user aware of the physical objects, it is appreciated that the first threshold condition can include one or more of other conditions such as an angle of the user device 206, a direction of movement of user device 206, a type of a physical object 208A, or the like.

In some embodiments, user device 206 further determines whether distance 304B is greater than a second threshold distance 406. If so, user device 206 determines that distance 304B is not within the second threshold distance 406. With reference to FIG. 3B, in some embodiments, in accordance with a determination that distance 304B is less than or equal to first threshold distance 306 and is greater than second threshold distance 406, user device 206 is configured to display a visual effect in virtual reality environment 260. In some embodiments, a visual effect indicates, for example, physical object 208A is located within first threshold distance 306 (e.g., 3 feet) from user device 206, but is still located outside of second threshold distance 406 (e.g., 1 feet).

In some embodiments, a visual effect includes one or more virtual objects. It will be appreciated that the visual effect can also include objects representing one or more objects of a physical environment (e.g., image of a physical object). In some examples, the one or more virtual objects for providing the visual effect may correspond to existing virtual objects in the virtual reality environment that is being displayed. As depicted in FIG. 3B, for example, user device 206 is currently displaying a virtual reality environment 260. To provide a visual effect corresponding to physical object 208A in physical environment 200, user device 206 can be configured to display a virtual glass wall 324, through which virtual beach chair 262A and virtual beach umbrella 262B can be viewed. In some examples, virtual glass wall 324 can correspond to physical object 208A in the physical environment 200 and provide a visual effect (e.g., translucency) to user 204 such that user 204 is made aware of physical object 208A disposed in the path of the user's movement.

In some embodiments, the position of the pane of (virtual) glass corresponds to second threshold distance 406 associated with physical environment 200. In physical environment 200, second threshold distance 406 can be a distance that indicates user device 206 is very close to a physical object (e.g., physical object 208A and 208E, a chair, a table, a wall). If user device 206 is within the second threshold distance 406, a visual effect displayed by user device 206 may not be sufficient to make user 204 aware of the physical environment. Thus, in some embodiments, user device 206 displays an image of at least a portion of the physical environment. Second threshold distance 406 can be represented in virtual reality environment 260, for example, as the distance between a virtual object (e.g., virtual beach chair 262A, virtual beach umbrella 262B, a virtual wall, a virtual painting, etc.) and virtual glass wall 324. As described in more detail below, if user device 206 is positioned at a distance less than or equal to second threshold distance 406, user device 206 displays a visual representation (e.g., an image/video) of at least part of physical environment 200. Correspondingly, in virtual reality environment 260, user device 206 can generate an effect (e.g., virtual glass wall 324 breaks or shatters) and display the visual representation of at least part of physical environment 200. In some embodiments, user device 206 can be configured to display different patterns and/or opaqueness associated with virtual glass wall 324 as the distance between user device 206 and the physical object varies. For example, virtual glass wall 324 can become increasingly less transparent as user device 206 moves closer to the physical object 208A in the physical environment 200.

In some embodiments, virtual beach chair 262A and virtual beach umbrella 262B are existing virtual objects in the virtual reality environment 260 being displayed. Virtual glass wall 324 is a newly-generated virtual object by user device 206 and is added to virtual reality environment 260 in accordance with the determination that user device 206 is positioned at a distance within first threshold distance 306. Thus, virtual glass wall 324 may not correspond to any virtual objects that already exist in virtual reality environment 260. In some embodiments, using virtual glass wall 324 enables the user to view existing virtual objects through virtual glass wall 324, thereby reducing the impact of adding a new virtual object to the virtual reality environment 260. Reducing the impact of adding new virtual objects as the visual effect in a virtual reality environment enhances user experience. It is appreciated that while FIG. 3B illustrates a virtual object such as a virtual glass wall 324 for providing a virtual indication, any virtual objects (e.g., existing virtual objects in the virtual reality environment or new virtual objects) can be used to provide a visual effect such that the user is made aware of the physical object(s) less than a threshold distance from the user device 206. FIGS. 4A-4E provide more examples of virtual objects used as visual effects, as discussed in more detail below.

Figure 3C:
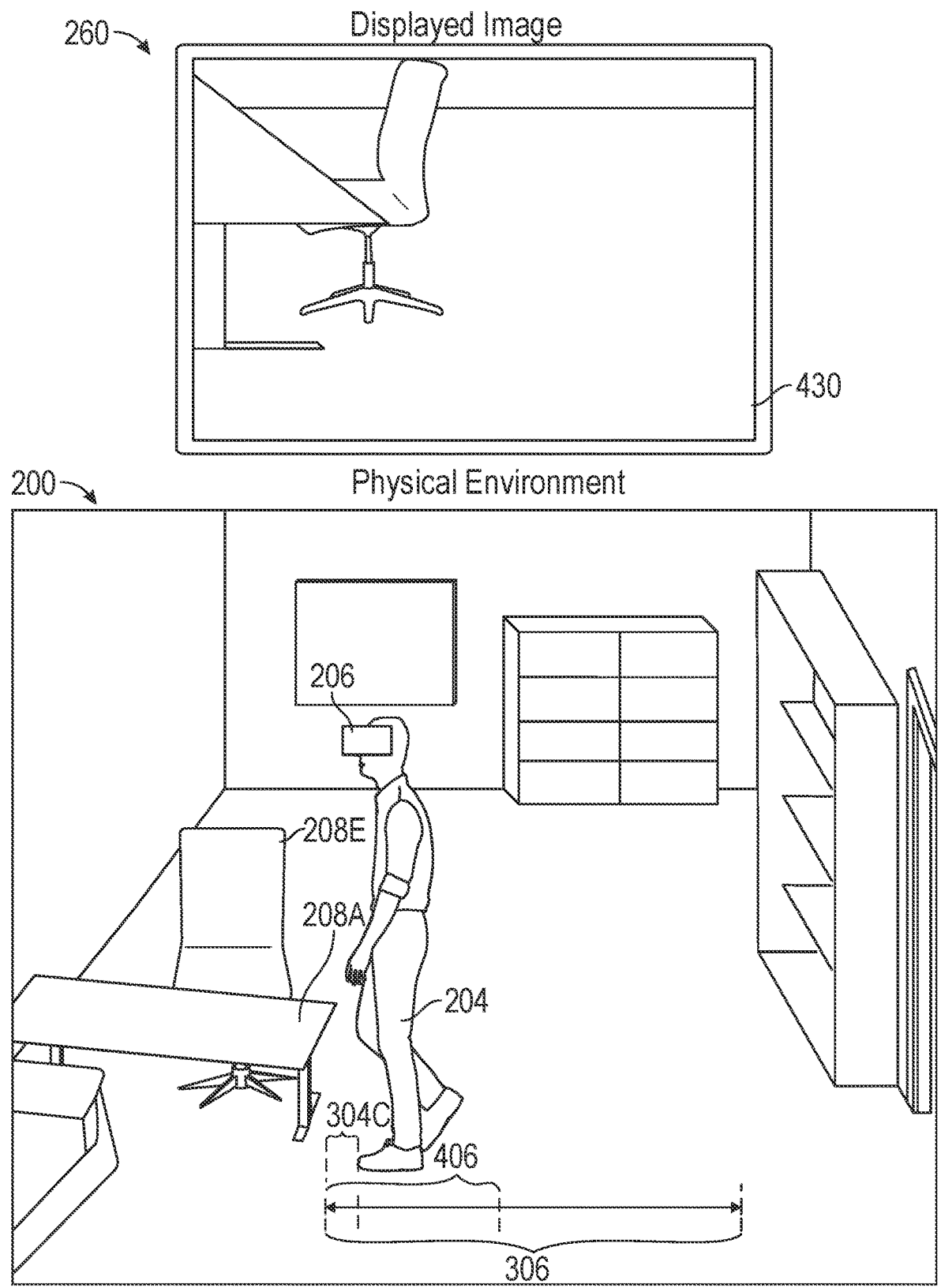
FIG. 3C depicts a user device positioned at a distance within a second threshold distance and an image of the physical environment displayed by the user device.

FIG. 3C depicts a user device 206 positioned at a distance 304C within a second threshold distance 406 and an image 430 of the physical environment 200 displayed by user device 206. With reference to FIG. 3C, user device 206 can be configured to determine whether distance 304C between user device 206 and physical object 208A in the physical environment 200 is within a second threshold distance 406. In some embodiments, after determining that distance 304C is within first threshold distance 306, user device 206 is configured to further determine whether the user device 206 continues to move toward physical object 208A (e.g., user 204 continues to walk toward physical object 208A with user device 206). If user device 206 determines that it is continuously being moved toward physical object 208A, user device 206 can be further configured to determine whether distance 304C is within a second threshold distance 406. If user device 206 determines that user device 206 is not moving or is moving away from physical object 208A, user device 206 continues to monitor its movement, as described above. For example, after seeing a visual effect (e.g., a virtual glass wall), a user may realize he or she is approaching a physical object, and stop moving such that the user is sitting or standing in front of physical object 208A. As a result, user device 206 determines that user device 206 is not moving. Accordingly, there is no immediate need for user device 206 to provide user 204 with further warning of physical object 208A and thus user device 206 continues to monitor its movement.

With reference to FIG. 3C, second threshold distance 406 can be, for example, a distance between physical object 208A in physical environment 200 and user device 206. As described above, user device 206 determines a distance between user device 206 and each of the physical objects in physical environment 200, using at least one of a depth sensor or a plurality of cameras. Thus, user device 206 can determine distance 304C between user device 206 and physical object 208A and compare the determined distance 304C with second threshold distance 406. Second threshold distance 406 indicates that user device 206 is at a distance at which visual effects (e.g., using virtual objects) may not be sufficient (e.g., in a timely manner) to make user 204 aware of the physical object(s) disposed in the path of user 204. Instead, user device 206 can provide user 204 with a visual representation of the physical environment. For example, a visual representation (e.g., a displayed image or video) of one or more physical objects 208 (e.g., objects 208A and 208E) in physical environment 200 can be displayed to user 204 so that user 204 is further aware of physical objects 208 in the path of the user 204.

In some embodiments, the first and second threshold distances are based on one or more properties of user device 206 and/or physical objects, such as physical objects 208. For example, user device 206 can determine a speed of user movement; and the first and second threshold distances can be dynamically and/or adaptively configured based on the determined speed. Thus, if user 204 is running and user device 206 determines that the speed of user movement exceeds a limit, user device 206 can be configured to increase the first and second threshold distances to account for the speed of user movement. Increasing the threshold distances can provide sufficient time to display visual effects (e.g., virtual objects) or visual representation (e.g., an image) of the physical environment such that user 204 can avoid colliding with physical objects 208. As another embodiment, user device 206 can determine a type of the physical object, and the first and second threshold distances can be dynamically and/or adaptively configured based on the type of the physical object. For instance, user device 206 can provide visual effects or visual representation of the physical environment at greater distances for certain types of physical objects (e.g., fireplace, stove, swimming pools) than for other types of physical objects (e.g., tables, chairs, sofa).

With reference to FIG. 3C, user device 206 can compare distance 304C with second threshold distance 406 by determining whether distance 304C between user device 206 and physical object 208A of physical environment 200 is less than or equal to second threshold distance 406. For example, if user device 206 determines that distance 304C is 0.5 feet, less than the second threshold distance of 1 foot, user device 206 determines that distance 304C is within second threshold distance 406. While FIG. 3C uses second threshold distance 406 as an illustration as a second threshold condition, it will be appreciated that the second threshold condition can include one or more of other conditions, such as an angle of user device 206, a direction of movement of user device 206, a type of a physical object 208, or the like.

With reference to FIG. 3C, user device 206 can be configured to, in accordance with a determination that distance 304C is within the second threshold distance 406, replace at least a portion of the display of the virtual reality environment with a visual representation of at least part of the physical environment. The visual representation can be an image and/or a video (e.g., live stream video) of the physical environment. The visual representation can be provided by one or more cameras of user device 206 to indicate that physical object 208A is within the second threshold distance (e.g., 1 feet) from user device 206. Thus, at distance 304C, physical objects 208A may be very close to user 204 and in response, user device 206 displays an image and/or a video of physical objects 208A to user 204. In the embodiment shown in FIG. 3C, user device 206 replaces the entire virtual reality environment 260 with a displayed image 430 (e.g., an image and/or a video of at least part of physical objects 208A and 208E). As described in more detail below, in some embodiments, user device 206 can replace a portion of, but not the entire, virtual reality environment with a visual representation of the physical environment.

Figure 3D:
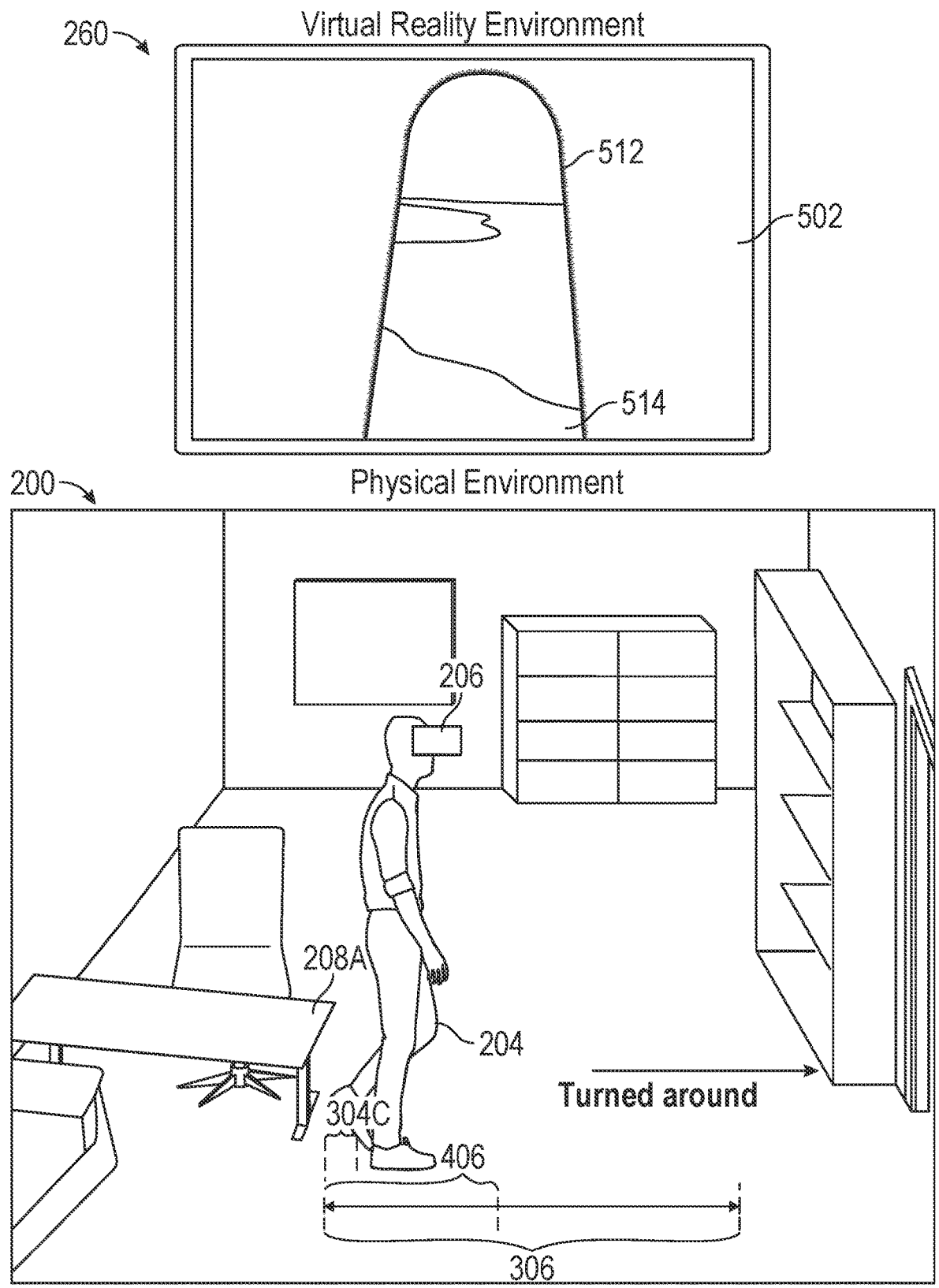
FIG. 3D depicts a user device positioned at a distance within a second threshold distance and oriented to face away from a physical object and the exemplary virtual reality environment displayed by the user device.

With reference to FIG. 3D, a user device 206 is positioned at a distance 304C within a second threshold distance 406 and oriented to face away from a physical object and the exemplary virtual reality environment 514 displayed by user device 206. As described above in FIG. 3C, user device 206 may replace at least a portion of the display of the virtual reality environment with a visual representation (e.g., an image/video) of the physical environment 200, if user device 206 determines that its distance from physical object 208A is within second threshold distance 406. In some embodiments, after replacing at least a portion of the display of the virtual reality environment with the visual representation (e.g., an image/video) of at least part of the physical environment 200, user device 206 determines whether the gaze of user 204 moves away from the visual representation of at least part of the physical environment 200. User device 206 can make such determinations by detecting whether the orientation of user device 206 changes. For example, using one or more motion sensors, cameras, accelerometers, or the like, user device 206 can determine that the orientation of user device 206 changes (e.g., user 204 turns around to face away from the physical object). In response, user device 206 determines that user device 206 is turning away from physical object 208A and resumes display, at least in part, of the virtual reality environment 260 as shown in FIG. 3D. User device 206 can also make such a determination by detecting whether the device is moving away from physical object 208A, for example, by detecting whether the distance between the device and the physical objects is increasing.

FIG. 3D depicts a display area 512 of a display of user device 206. User device 206 can display a second virtual reality environment 514 in display area 512. Second virtual reality environment 514 can be displayed, for instance, after user device 206 determines that user 204 has turned around to face away from physical object 208A. In some embodiments, virtual reality environment 514 is the same as or similar to the previous virtual reality environment 260 displayed before it was replaced with at least a portion of the visual representation (e.g., an image/video) of the physical environment 200 (as described with respect to FIG. 3C). For example, second virtual reality environment 514 can be displayed as part of virtual reality environment 260 viewed as if user 204 turned around. Display area 512 can have a shape of a window, a gate, or any other desired shape.

As described above, if distance 304C between user device 206 and physical object 208A is within a second threshold distance 406, user device 206 displays a visual representation (e.g., image 430 shown in FIG. 3C) of physical environment 200 (e.g., replaces the entire virtual reality environment with the visual representation of at least part of physical environment 200). With reference to FIG. 3D, if distance 304C between user device 206 and physical object 208A increases and/or the orientation of user device 206 changes (e.g., user device 206 faces away from physical object 208A as user 204 turns around), continuing to display the image/video of at least part of physical environment 200 may not be desirable or needed. Thus, in some embodiments, user device 206 optionally removes, darkens, or ceases to display the visual representation of at least part of the physical environment 200 (e.g., makes background area 502 blank or dark). As depicted in FIG. 3D, user device 206 displays a second virtual reality environment 514 in display area 512 within background area 502. In some embodiments, at least one dimension of display area 512 varies based on a distance between user device 206 and physical objects 208. For example, as distance 304C between user device 206 and physical object 208A increases, display area 512 is enlarged such that more area of second virtual reality environment 514 is displayed.

In some embodiments, second virtual reality environment 514 displayed in display area 512 is the same virtual reality environment that was previously replaced by the visual representation of the physical environment. For example, as depicted in FIG. 3D, second virtual reality environment 514 displayed in display area 512 can be the same virtual beach (viewed as if user 204 turned around) that was previously displayed in virtual reality environment 260 before it was replaced by the visual representation of physical environment 200.

As described above with respect to FIG. 3B, if user device 206 determines that distance 304B is less than first threshold distance 306 and greater than second threshold distance 406, user device 206 is configured to display a visual effect in virtual reality environment 260. FIG. 3B depicts a virtual glass wall 324 as an example of visual effect. FIGS. 4A-4E depict various additional exemplary visual effects displayed in virtual reality environment 260 corresponding to the user device being positioned at a distance that is less than the first threshold distance 306 and greater than the second threshold distance 406 from the physical objects 208 (e.g., objects 208A and 208E).

Figure 4A:
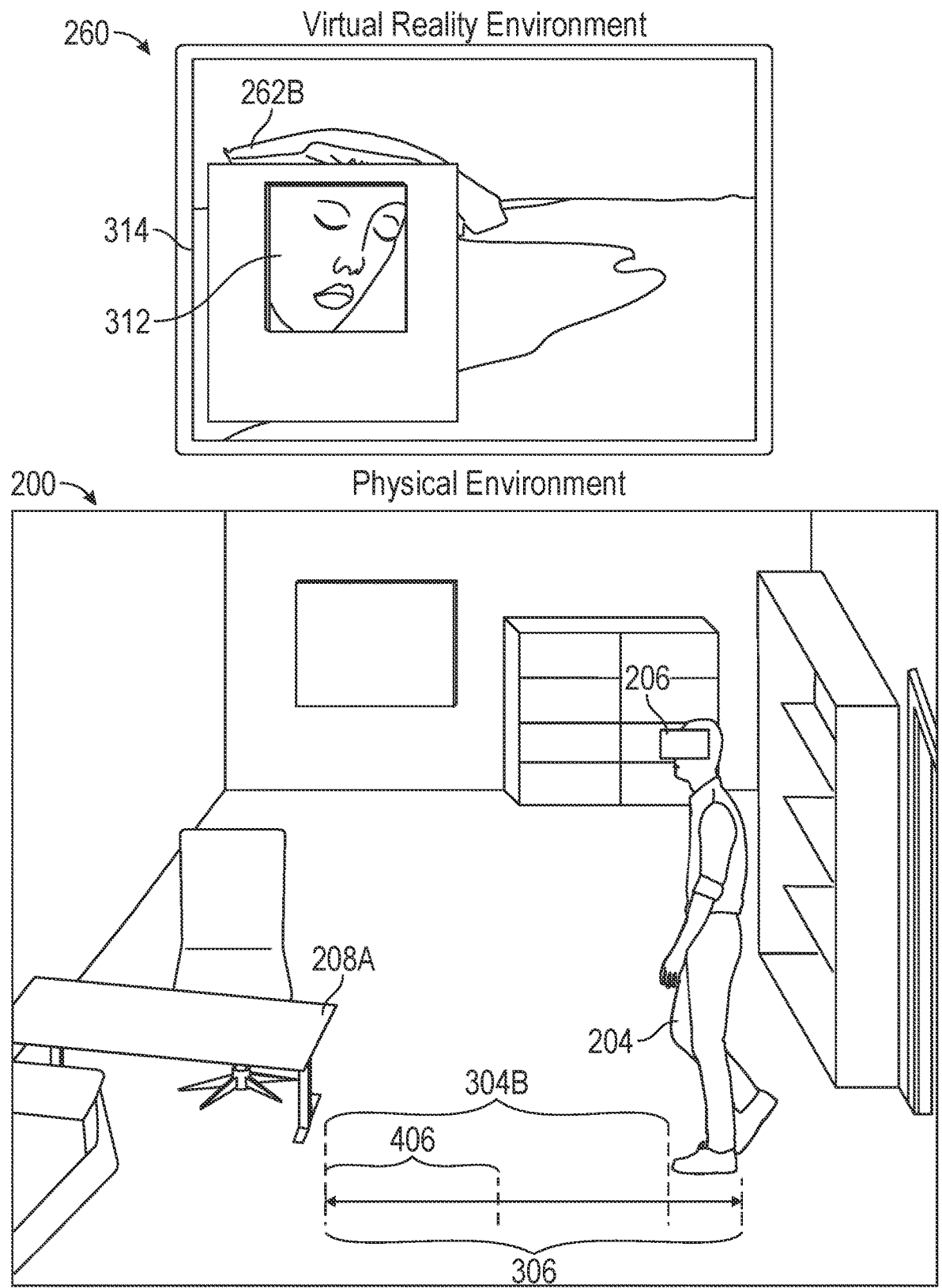
FIGS. 4A-4E depict various exemplary visual effects displayed in a virtual reality environment corresponding to the user device positioned at a distance that is within the first threshold distance.

For example, as shown in FIG. 4A, virtual reality environment 260 may include one or more virtual objects (e.g., a virtual beach umbrella 262B). In some embodiments, to provide a visual effect corresponding to a physical object in physical environment 200, user device 206 can be configured to display a virtual wall 314 and/or a virtual painting 312 hanging on virtual wall 314. Virtual wall 314 and/or virtual painting 312 can provide a visual effect to the user such that the user is made aware of the physical object disposed in the path of the user's movement. In some embodiments, virtual wall 314 and/or virtual painting 312 can correspond to (e.g., are duplicates of) other virtual objects that exist in virtual reality environment 260. User device 206 is optionally configured, for example, to reuse these existing virtual objects to generate new virtual objects that provide a visual effect corresponding to the physical object. Reusing existing virtual objects, rather than using objects that do not otherwise exist in the virtual reality environment, can reduce the impact of the visual effect on the displaying of the virtual reality environment. Reducing the impact of the visual effect enhances user experience and improves the efficiency in generating the virtual objects without having to significantly alter the virtual reality environment.

Figure 4B:
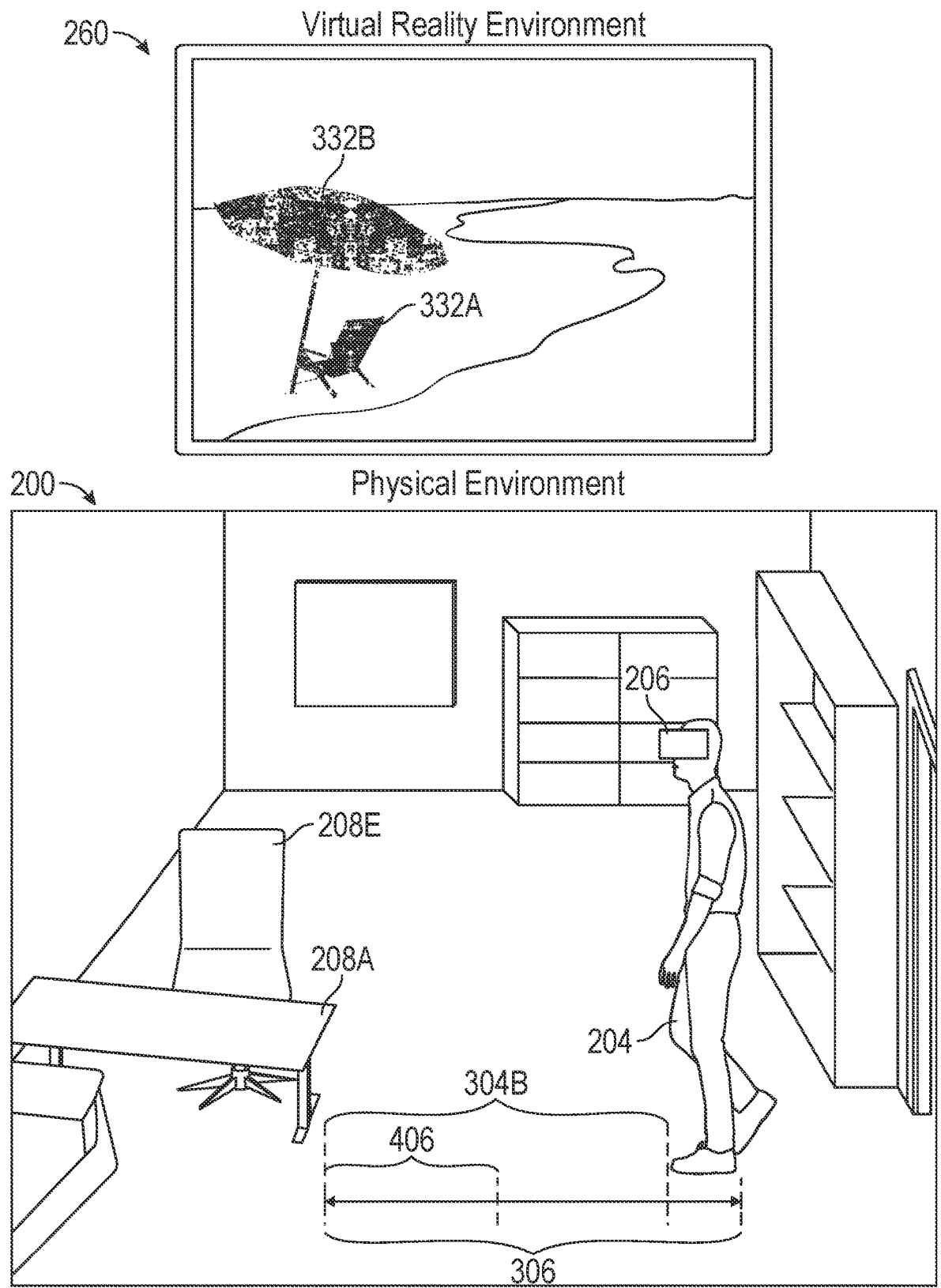

An additional embodiment of providing a visual effect corresponding to distance 304B associated with a physical object is depicted in FIG. 4B. With reference to FIG. 4B, virtual reality environment 260 is displayed, and can include a virtual beach chair, a virtual beach umbrella, and the like. As depicted in FIG. 4B, in some embodiments, user device 206 can vary an appearance of a virtual object as a virtual indication. The variation of the appearance can be based on the distance between user device 206 and physical objects 208 (e.g., 208A and 208E). For example, as user device 206 moves closer to physical object 208A, the appearance of virtual objects 262A-B (shown in FIG. 3A) may transition to the appearance of virtual objects 332A-B, respectively (shown in FIG. 4B). Virtual objects 332A-B can have shapes that are similar to virtual objects 262A-B, respectively, but can have particle/feathering effects. In some embodiments, as user device 206 moves closer to physical object 208A, virtual objects 332A-B can become less transparent and/or have denser particles (or vice versa). A less transparent virtual object or a virtual object having denser particles can provide a visual effect to indicate that the corresponding physical object is closer than a virtual object that is more transparent or having sparser particles. In some embodiments, this type of visual effect can be intuitive and readily understood or captured by the user, thereby further enhancing the user experience and improving the efficacy of the visual effect. It is appreciated that while FIG. 4B illustrates virtual objects using virtual objects 332A-B, any virtual objects (e.g., existing objects in the virtual reality environment or new virtual objects) can be used to provide the visual effect such that the user is made aware of the physical objects in a physical environment, toward which the user is approaching.

Figure 4C:
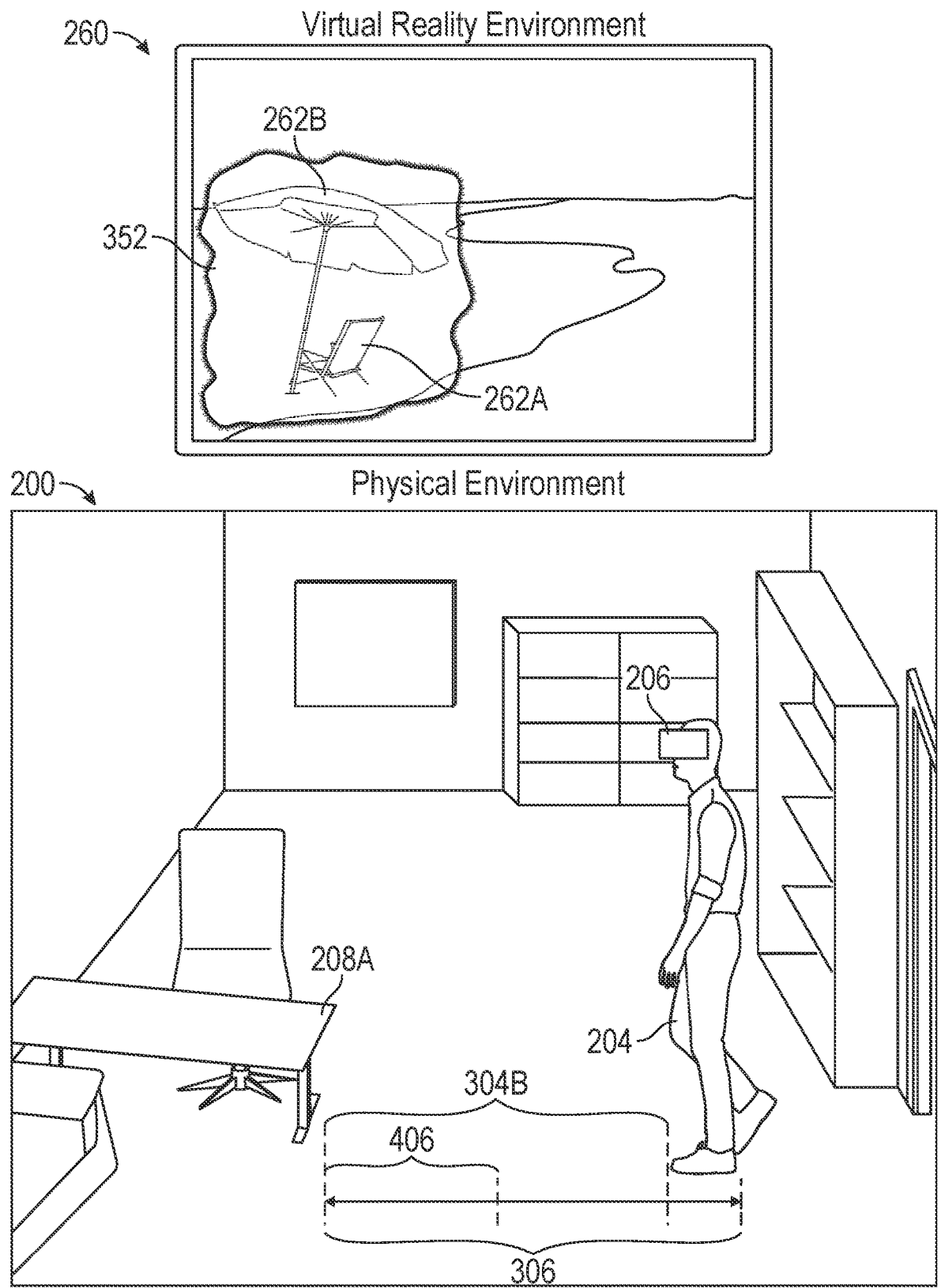
Figure 4D:
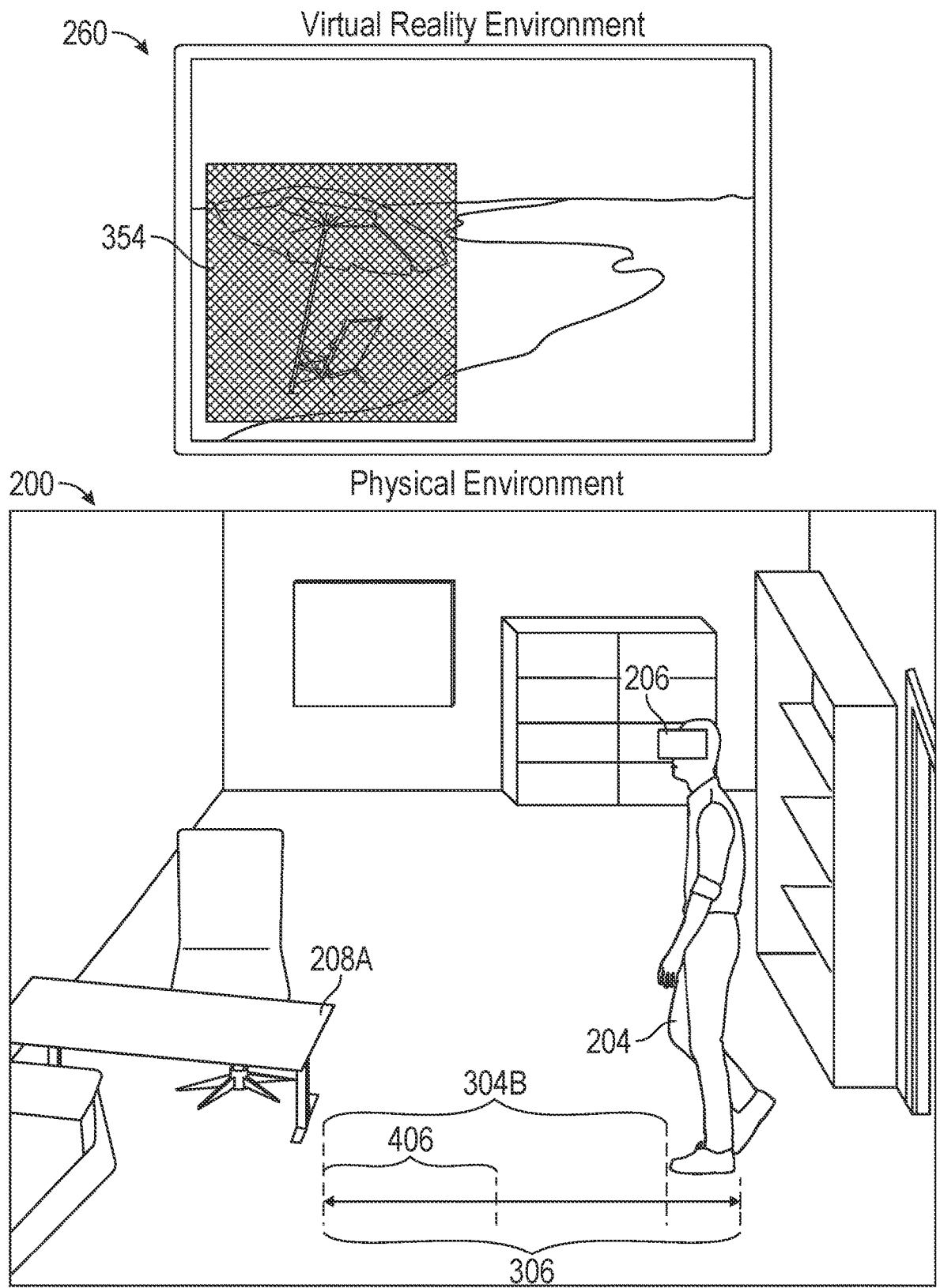

Additional embodiments of providing visual effects corresponding to distance 304B associated with a physical object are depicted in FIGS. 4C-4D. With reference to FIG. 4C, user device 206 is currently displaying virtual reality environment 260. Virtual reality environment 260 may include virtual objects, such as virtual beach chair 262A and virtual beach umbrella 262B, or the like. To provide a visual effect corresponding to a physical object (e.g., object 208A) in physical environment 200, user device 206 displays a virtual fog 352 disposed in front of one or more existing virtual objects, such as virtual beach chair 262A and virtual beach umbrella 262B. The location of the fog in virtual reality environment 260 can indicate a location of a physical object (e.g., object 208A) in physical environment 200 relative to user 204 in some embodiments. In some embodiments, the appearance of fog 352 is created by blending and/or blurring the underlying virtual objects (e.g., 262A-B) to produce a translucent visual effect.

In some embodiments, as depicted in FIG. 4D, user device 206 may similarly reduce the brightness of or apply darkening effect 354 to one or more virtual objects and/or portions of virtual reality environment 260 to indicate the location of one or more physical objects 208 (e.g., 208A) of a physical environment 200 relative to the user 204. Virtual fog 352 and/or a darkening effect 354 can provide a visual effect to the user such that the user is made aware of the physical object disposed in the path of the user. In some embodiments, the visual effect generated based on a virtual fog 352 or darkening effect 354 can be intuitive and readily understood or captured by the user, thereby further enhancing the user experience and improving the efficacy of the visual effect. For example, a user is typically less likely to move into, or more likely to avoid, a foggy or darkened area.

Figure 4E:
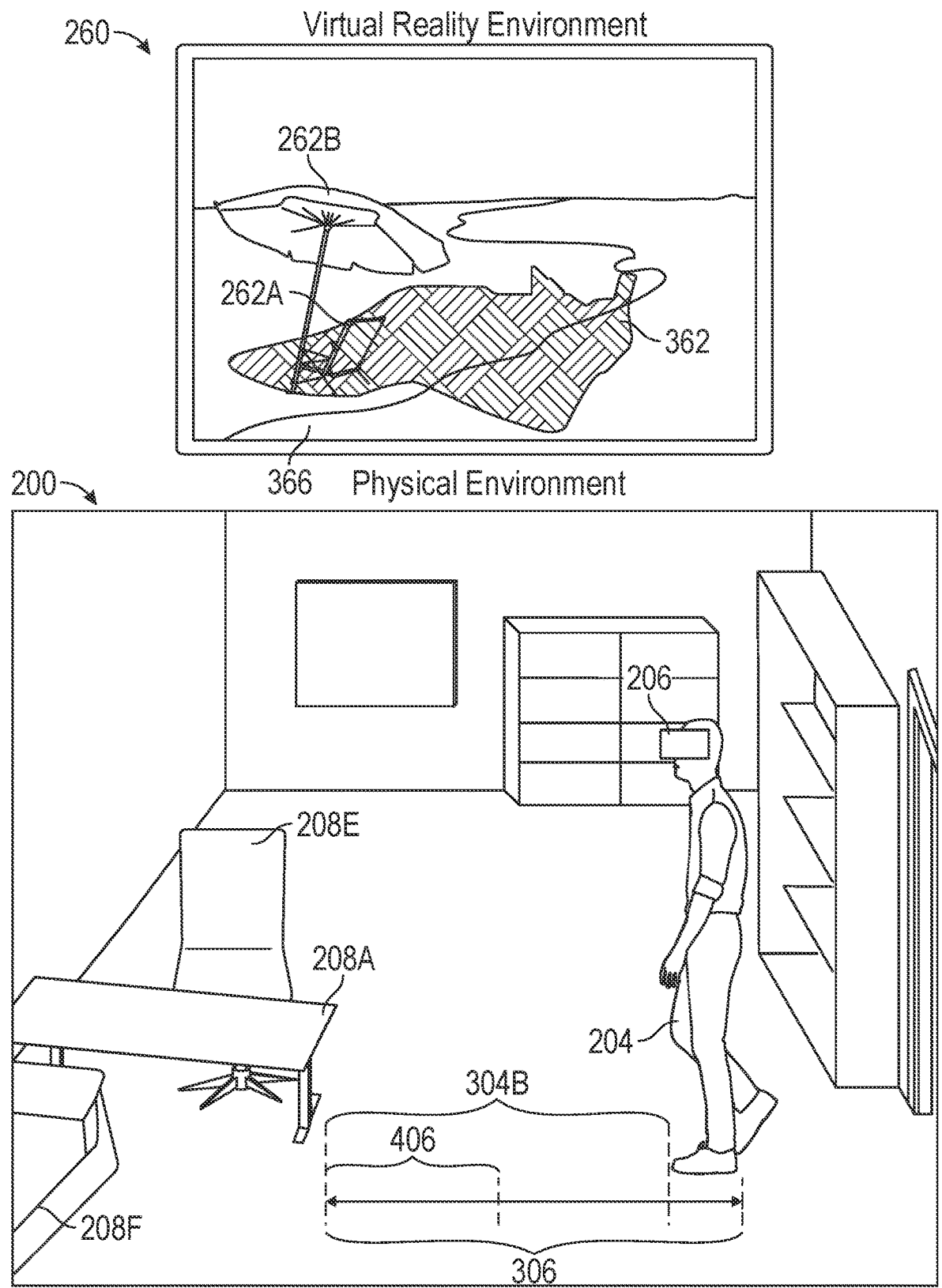

An additional embodiment of providing a visual effect corresponding to distance 304B associated with a physical object is depicted in FIG. 4E. With reference to FIG. 4E, user device 206 is currently displaying virtual reality environment 260. Virtual reality environment 260 includes virtual objects, such as a virtual beach chair 262A and a virtual beach umbrella 262B, or the like. To provide a visual effect corresponding to a physical object in a physical environment 200, user device 206 can be configured to display a darkened area 362. In some embodiments, darkened area 362 is disposed on virtual ground surface 366 (e.g., on the virtual beach) and corresponds to a location of the physical objects (e.g., objects 208A, 208E, and 208F) in the physical environment 200. For example, darkened area 362 can be configured to have a boundary that corresponds to (e.g., tracks) the position or boundary of physical objects 208A (e.g., a desk), 208E (e.g., a chair), and 208F (e.g., a sofa).

In some embodiments, at least one dimension of a darkened area, such as the darkened area 362, can be configured to indicate the corresponding dimension of the physical object. For example, if the longitudinal dimension of the physical object is greater than a lateral dimension, darkened area 362 can be configured to have a corresponding greater longitudinal dimension as well. In some embodiments, user device 206 can be configured to vary a degree of the darkening in darkened area 362 based on the distance between user device 206 and the physical object. For example, as user device 206 moves closer to the physical object, the degree by which darkened area 362 is darkened can increase (e.g., become darker), or decrease. In some examples, darkened areas may have any shape. Darkened areas may, for instance, be substantially triangular, rectangular, circular, oval, or any other shape.

Darkened area 362 provides a visual effect to the user such that the user is made aware of the physical object disposed in the path of the user. As described above, the visual effect generated based on darkening of certain area in a virtual reality environment can be intuitive and readily understood or captured by the user, thereby further enhancing the user experience and improving the efficacy of the visual effect. For example, a user is typically less likely to move into, or more likely to avoid, a darkened area. It is appreciated that while FIG. 4E illustrates using darkened area 362 as visual effects, any virtual effect (e.g., shading, coloring, distorting, blurring, shaking, or the like) can be applied to the virtual reality environment in any manner (e.g., applied to the ceiling, wall, floor, or one or more objects) to provide the visual effect such that the user is made aware of the physical objects disposed in a physical environment near the user and/or toward which the user is approaching.

As described above, various visual effects (e.g., a virtual wall, a virtual glass, a virtual fog, a particle/feathering effect, a darkened area, etc.) can be applied to or disposed in the virtual reality environment if user device 206 determines that distance 304B is within the first threshold 306 as shown in FIGS. 3B and 4A-4E and, optionally, is not within the second threshold distance 406 as shown in FIGS. 3B and 4A-4E. In some embodiments, as described above, despite providing the visual effects to the user 204, the user (and the user device 206 worn by the user) may continue to move toward the physical object beyond first threshold distance 306 and thus distance 304B between user device 206 and the physical object may continue to decrease to distance 304C.

Figure 5A:
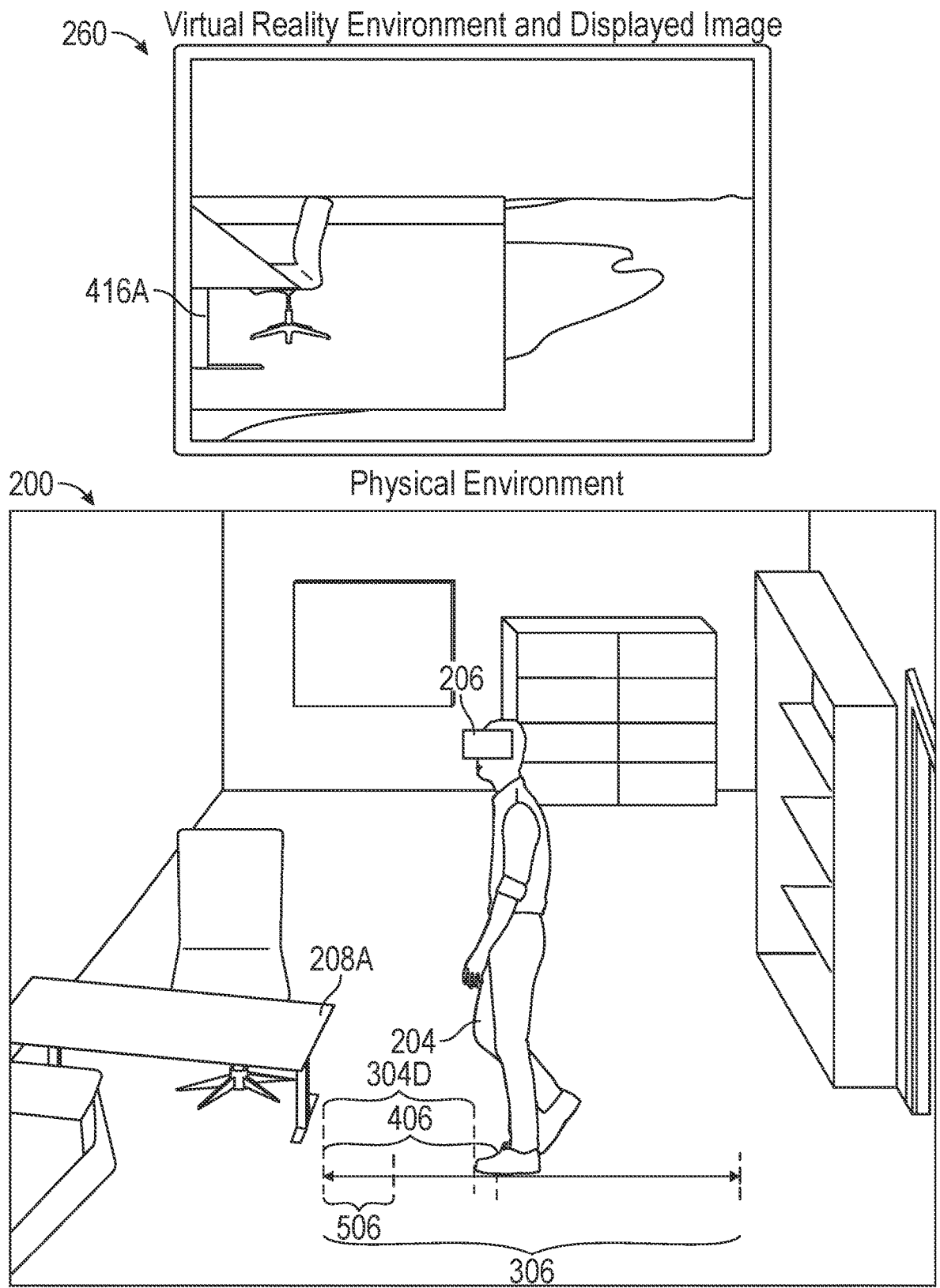
FIGS. 5A-5C depict a user device positioned at various distances within a second threshold distance and corresponding images of at least a part of an exemplary physical environment displayed by the user device.
Figure 5B:
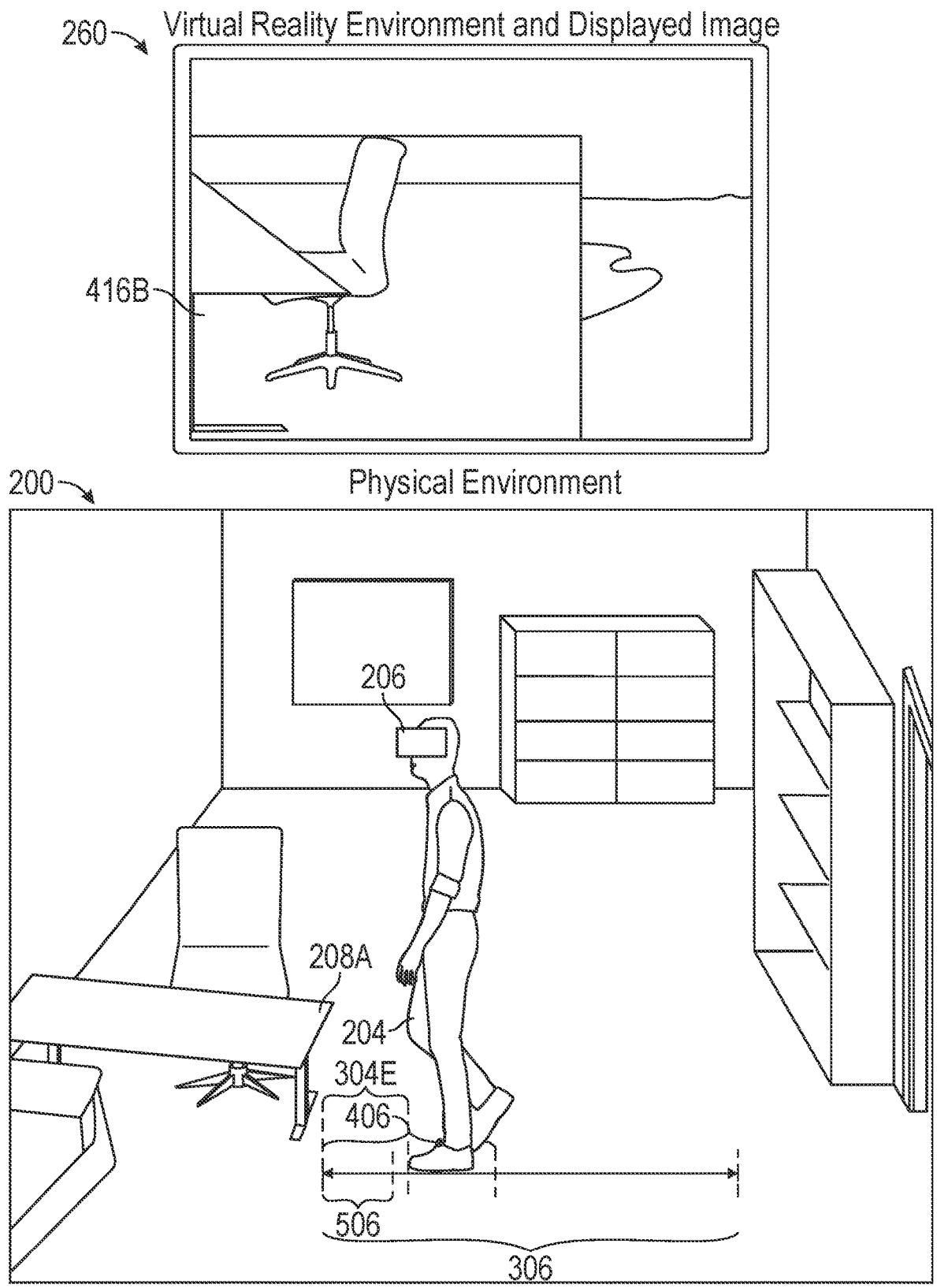
Figure 5C:
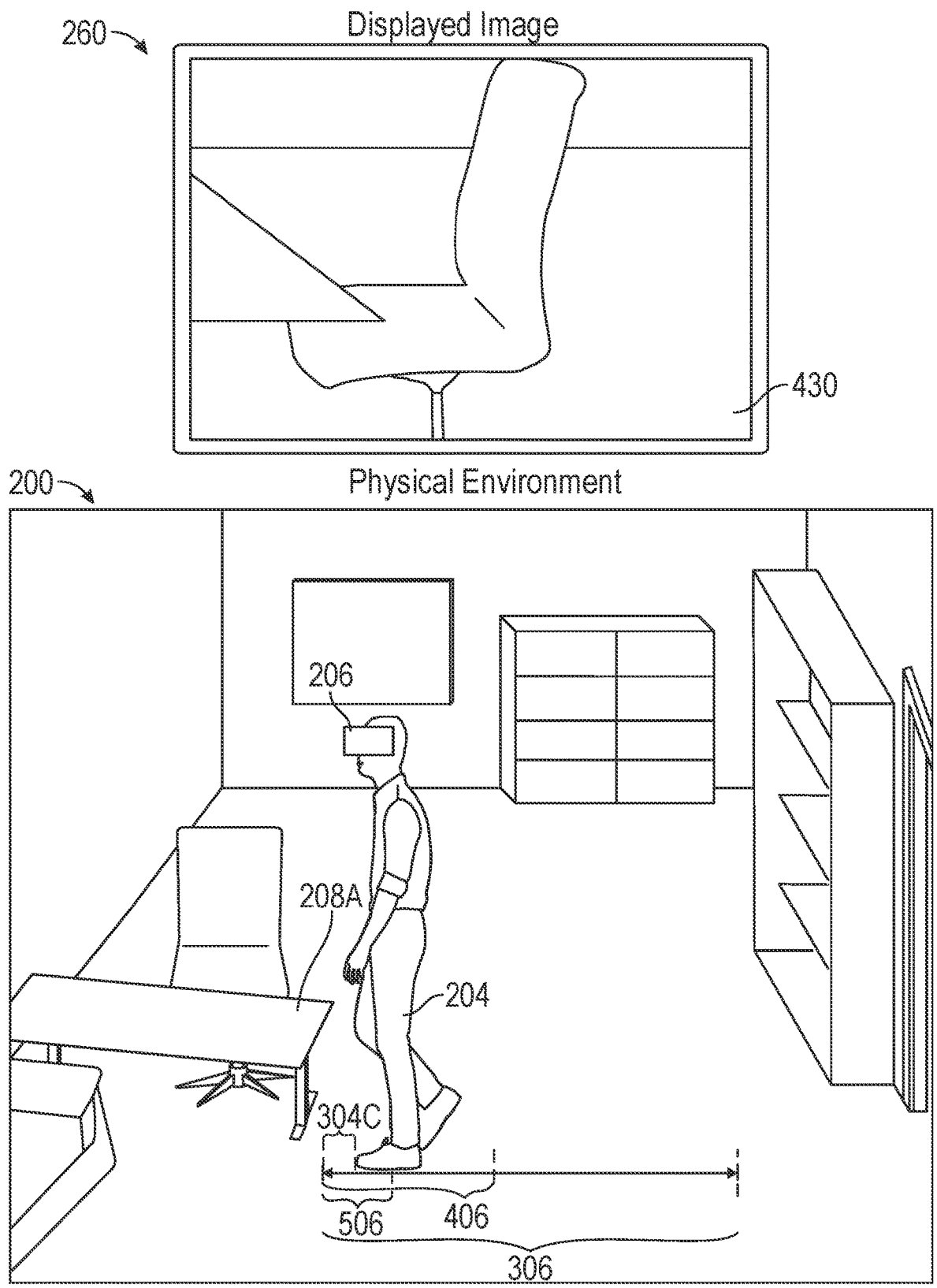

As described above, FIG. 3C depicts an example where user device 206 determines that distance 304C is within second threshold distance 406, and thus replaces the entire display of the virtual reality environment 260 with a visual representation (e.g., image 430) of at least part of the physical environment 200. FIGS. 5A-5C depict a user device 206 positioned at various distances within a second threshold distance 406 and corresponding images of at least a part of an exemplary physical environment 200 displayed by user device 206.

In the example of FIG. 5A, in some embodiments, user device 206 is located at distance 304D from physical objects 208. Distance 304D can be, for example, less than second threshold distance 406 but greater than a third threshold distance 506. As described above, because distance 304D is determined to be less than second threshold distance 406 (and therefore within the second threshold distance 406), user device 206 displays a visual representation 416A (e.g., image and/or video) of at least part of a physical environment 200 (e.g., physical objects 208A and 208E) and at least a portion of the virtual reality environment 260 (e.g., the virtual beach and virtual sky). As illustrated in FIG. 5A, because distance 304D is greater than or equal to third threshold distance 506 (described in more detail below), user device 206 replaces only a portion, but not all, of display of virtual reality environment 260 with visual representation 416A; and when distance between user device 206 and physical object 208A (e.g., distance 304C shown in FIGS. 3C and 5C) is less than the third threshold distance 506, user device 206 replaces the entire display of virtual reality environment 260. The visual representation 416A can have a shape of a window, a gate, or any other desired shape in some examples.

In some embodiments, at least one dimension of the visual representation 416A varies based on the distance between user device 206 and physical objects 208 (e.g., object 208A). As depicted in FIG. 5A, visual representation 416A can be provided at any area of the display (e.g., the lower left corner) to replace a portion of virtual reality environment 260. In some embodiments, user device 206 increases the dimensions of the area for displaying visual representation 416A if user device 206 continues to move closer to physical object 208A. As shown in FIG. 5B, as user device 206 moves closer to physical object 208A (e.g., moves to distance 304E), user device 206 can replace a bigger portion of virtual reality environment 260 with visual representation 416B. Visual representation 416B has dimensions (e.g., width and/or length) that are larger than those of visual representation 416A shown in FIG. 5B, for example. In some embodiments, at least one dimension of the area for displaying a visual representation varies based on the type of the physical objects. For instance, the area for displaying a visual representation replaces more area of the virtual reality environment 260 for certain types of physical objects (e.g., fireplace, stove, swimming pools) than for other types of physical objects (e.g., tables, chairs, sofa).

In some embodiments, a physical object may be located very close to the user (e.g., within the distance that the user can touch or feel it), and using a visual representation in a portion of the display area for indication or highlighting may not be sufficient. FIG. 5C provides an example of replacing the entire virtual reality environment 260 with a visual representation (e.g., image 430) of at least a part of a physical environment 200. For example, user device 206 may be moved to a distance 304C that is less than a third threshold distance 506 from physical object 208A. Third threshold distance 506 is less than second threshold distance 406. In some embodiments, if user device 206 is positioned within third threshold distance 506, user device 206 can determine that immediate attention or warning is required to prevent user 204 from colliding with physical object 208A. For example, physical object 208A may be located immediately in front of the user or within a distance such that the user can touch the physical object 208A. If user device 206 determines that distance 304C is less than or equal to third threshold distance 506, then user device 206 replaces the entire virtual reality environment with a visual representation (e.g., image 430) of at least part of a physical environment 200 that includes physical objects 208 (e.g., objects 208A and 208E). As illustrated in FIG. 5C, user device 206 displays a virtual representation (e.g., an image or video 430) in a full-screen mode, replacing the entire virtual reality environment 260. In some embodiments, replacing the entire virtual reality environment with a visual representation of a physical environment can provide an increased level of indication, highlighting, and/or warning to the user versus displaying a visual representation in a part of the area for displaying the virtual reality environment. As a result, user device 206 now displays the virtual reality environment 260 and the user 204 can take immediate action to avoid contact or collision with any physical objects or obstacles located in the physical environment 200. For example, user 204 may stop moving toward physical object 208A, move to a different direction, or move away from physical object 208A.

As described above with respect to FIG. 3D, in some embodiments, if user device 206 determines that user device 206 is turning away (e.g., user 204 turned around) from physical object 208A, user device 206 displays a second virtual reality environment 514 after replacing at least a portion of the display of the previous virtual reality environment 260 with the visual representation of at least part of the physical environment. In the embodiment depicted in FIG. 3D, second virtual reality environment 514 is displayed within a display area 512. Images and/or videos of the physical environment 200 in the background area 502, which is outside of display area 512, are removed, darkened, or cease to display.

Figure 6A:
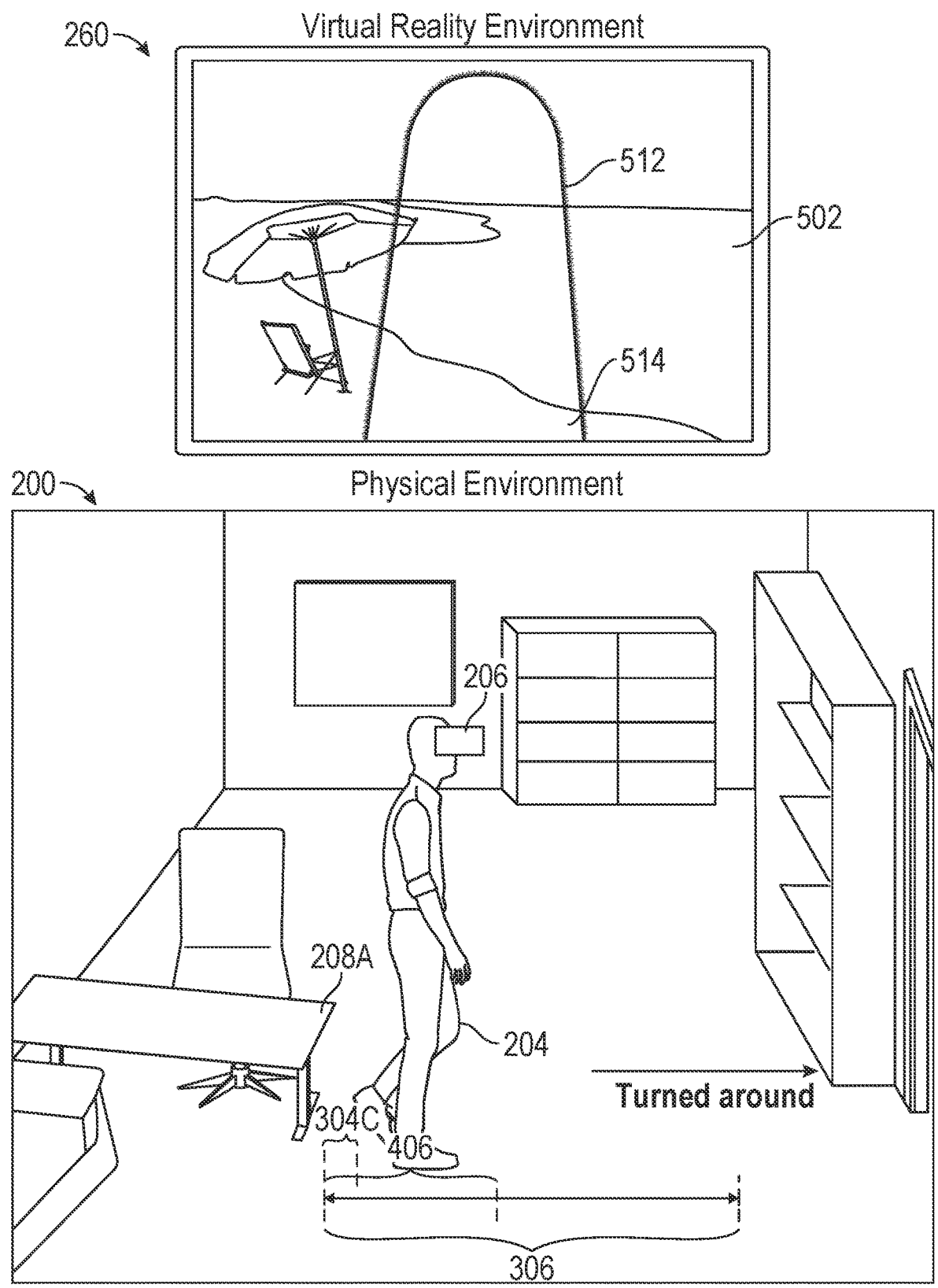
FIGS. 6A-6B depict a user device positioned within a second threshold distance and oriented to face away from a physical object and exemplary virtual reality environments and/or images of the physical environment displayed by the user device.
Figure 6B:
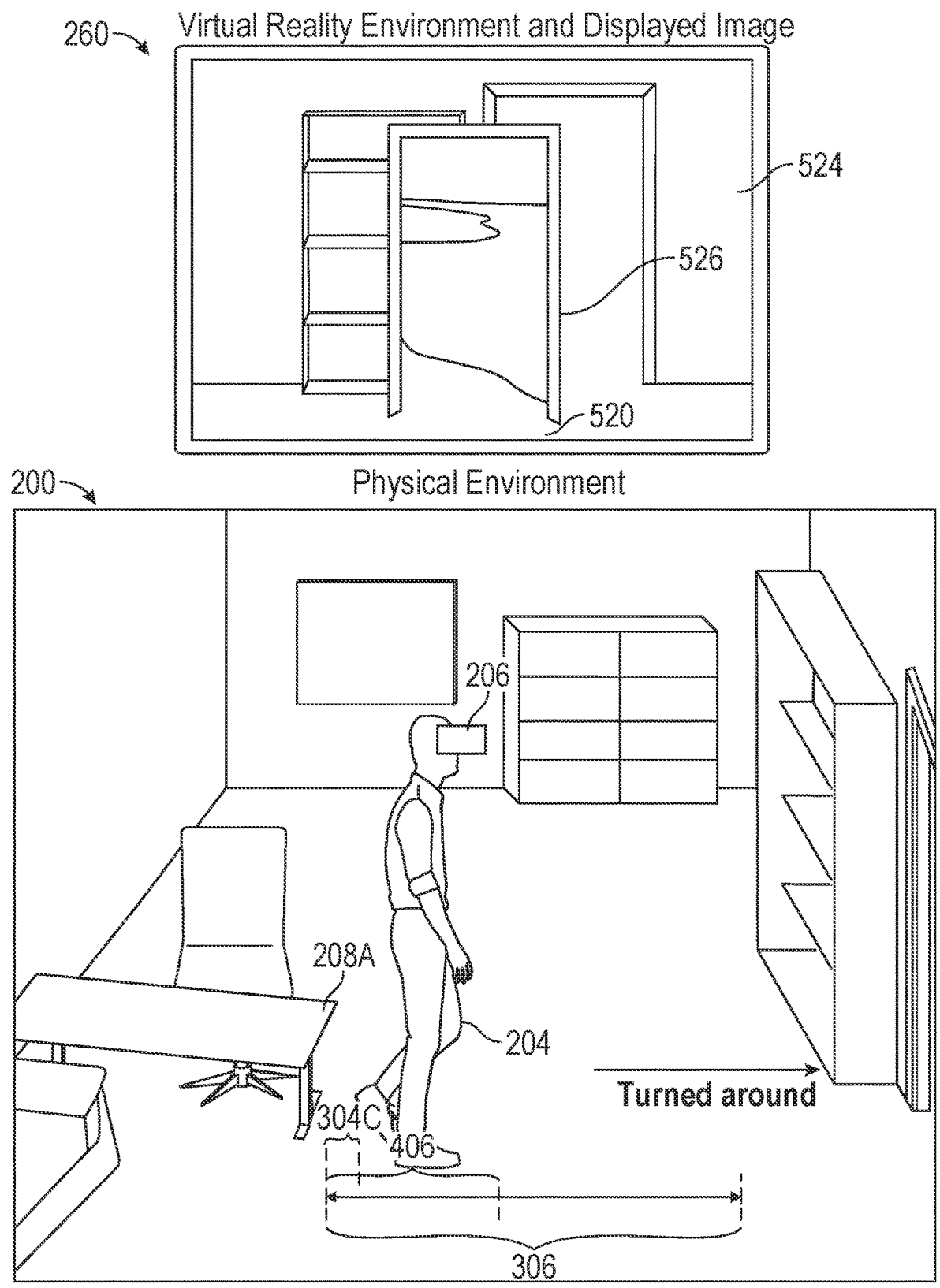

FIGS. 6A-6B depict a user device 206 positioned at a distance 304C within a second threshold distance 406 and oriented to face away from a physical object and exemplary virtual reality environments and/or images of the physical environment displayed by user device 206. With reference to FIGS. 6A and 6B, user device 206 displays second virtual reality environment 514 in display area 512 in response, for instance, to user device 206 determining that the user 204 has turned around or moved away from physical object 208A. Display area 512 can have the shape of a window, a gate, or any other desired shape.

FIG. 6A depicts an embodiment of displaying a part of second virtual reality environment 514 (e.g., a virtual beach) within display area 512 and another part of second virtual reality environment 514 outside of display area 512 (e.g., in the background area 502). In this embodiment, user device 206 replaces the entire visual representation of the physical environment 200 that was previously displayed with virtual reality environment 514. As a result, user device 206 displays a part of second virtual reality environment 514 in display area 512 and another part in background area 502 that is outside of display area 512. In some embodiments, when the user device 206 is turned around or moved away from physical object 208A in physical environment 200, providing a second virtual reality environment 514 that is similar to, or a continuation of, the previously-displayed virtual reality environment 260 can generate an effect as if the user is reentering the previously displayed virtual reality environment 260. This effect enhances the user experience.

FIG. 6B depicts a display area 526 in which a third virtual reality environment 520 is displayed. As shown in FIG. 6B, user device 206 displays third virtual reality environment 520 in display area 526 in response, for instance, to user device 206 determining that the orientation of user device 206 has changed as user 204 has turned around and/or moved away from the physical object 208A. As described above with respect to FIG. 3C, if distance 304C between user device 206 and a physical object 208 (e.g., 208A) is within second threshold distance 406, user device 206 may replace the entire virtual reality environment 260 with the visual representation (e.g., an image/video) of at least part of the physical environment (e.g., when distance 304C is less than third threshold distance 506). FIG. 6B shows such an image 524 of the physical environment 200. If user device 206 determines that the gaze of user 204 moves away from image 524 of the physical environment (e.g., the user turns around or orientation of user device 206 changes) and/or the distance between user device 206 and physical object 208A increases, user device 206 can display a third virtual reality environment 520 in display area 526. In some embodiments, at least one dimension of display area 526 can be configured to vary based on the distance between user device 206 and the physical object 208A. For example, as the distance between user device 206 and physical object 208A increases, the dimensions of display area 526 become bigger such that more area of third virtual reality environment 520 is displayed. As depicted in FIG. 6B, display area 526 can have a shape of a gate or a door and third virtual reality environment 520 can be similar to, or a continuation of, the previously-displayed virtual reality environment 260. Thus, providing display area 526 can generate the effect that the user is walking into the gate or door to enter (or reenter) the previously-displayed virtual reality environment 260. By positioning the display area 526 relative to the ground, the user may more readily determine the distance between the user device 206 and the position of display area 526 as if it is in the physical environment.

Figure 7A:
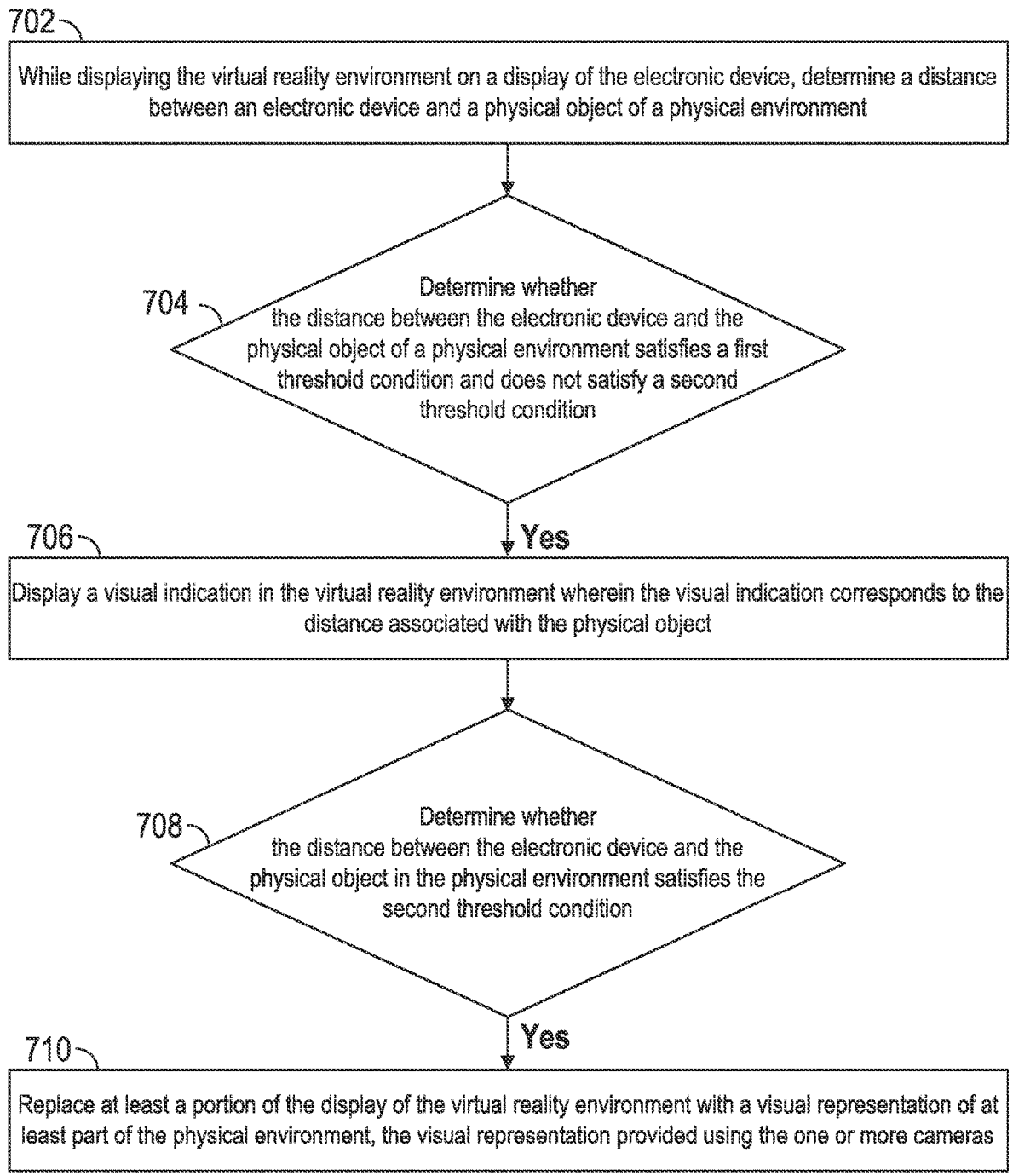
FIGS. 7A-7B depict flow charts of exemplary techniques for indicating physical obstacles in a mixed-reality environment.

Turning now to FIG. 7A, a flow chart of exemplary process 700 for indicating physical obstacles in a mixed-reality environment is illustrated. In the description below, process 700 is described as being performed using a user device (e.g., device 100a). The user device is, for example, a handheld mobile device or a head-mounted device, such as device 100a of FIG. 1A and device 206 of FIGS. 2, 3A-3D, 4A-4E, 5A-5C, and 6A-6B. It should be recognized that, in other embodiments, process 700 is performed using two or more electronic devices, such as a user device that is communicatively coupled to another device, such as a base device. In these embodiments, the operations of process 700 are distributed in any manner between the user device and one or more other devices. Further, it should be appreciated that the display of the user device can be transparent or opaque. It should be appreciated that one or more blocks of process 700 can be omitted and/or one or more additional blocks can be performed at any point during the process 700.

At block 702, a virtual reality environment is displayed on a display of an electronic device. At block 704, a distance between the electronic device and a physical object of a physical environment is determined. The electronic device is a virtual reality headset. At block 706, whether the distance between the electronic device and a physical object of a physical environment is within a first threshold distance is determined. In some embodiments, determining whether the distance between the electronic device and the physical object is within the first threshold distance includes determining whether the electronic device is moving toward the physical object in the physical environment is determined.

At block 708, in accordance with a determination that the distance is within the first threshold distance a visual effect is displayed in the virtual reality environment. The visual effect corresponds to the distance associated with the physical object. In accordance with a determination that the distance is not within the first threshold distance, the virtual reality environment is continuously displayed without any visual effect of the physical object.

In some embodiments, displaying the virtual indication includes displaying one or more virtual objects (e.g., virtual wall, virtual glass wall, virtual fog, particle/feathering effect, darkening) on the virtual reality environment displayed. The one or more virtual objects indicate that the physical object is within a first threshold distance from the electronic device. In some embodiments, an appearance of at least one of the one or more virtual objects varies based on the distance between the electronic device and the physical object.

In some embodiments, displaying the virtual indication includes displaying a darkened area on a virtual ground of the virtual reality environment displayed. The darkened area corresponds to a location of the physical object in the physical environment. A degree of the darkening in the darkened area can vary based on the distance between the electronic device and the physical object. At least one dimension of the darkened area can indicate one or more corresponding dimension of the physical object. In some embodiments, the darkened area has a substantially triangular shape.

At block 710, whether the distance between the electronic device and the physical object in the physical environment is within a second threshold distance is determined. In some embodiments, whether the electronic device continues to move beyond the first threshold distance toward the physical object is determined. In accordance with a determination that the electronic device continues to move beyond the first threshold distance toward the physical object, whether the distance between the electronic device and the physical object of the physical environment is less than or equal to a second threshold distance is determined.

In some embodiments, one or both of the first threshold distance and the second threshold distance are configured based on a speed of the electronic device's movement and/or based on a type of the physical object.

At block 712, in accordance with a determination that the distance is within the second threshold distance, a visual representation of at least part of the physical environment is displayed. The visual representation is provided by the one or more cameras. In some embodiments, whether the electronic device is moving towards or moving away from the physical object is determined. In accordance with a determination that the electronic device is moving towards the physical object, the darkened area is darkened based on the distance between the electronic device and the physical object. In accordance with a determination that the electronic device is moving away from the physical object, the darkened area is lightened. At least one dimension of the visual representation can vary based on a distance between the electronic device and the physical object, and/or based on the type of the physical objects.

In some embodiments, after replacing at least a portion of the virtual reality environment displayed with the visual representation of at least part of the physical environment, whether a distance between the electronic device and the physical object is increasing is determined. For example, the distance is increasing if the user device is moving away from the physical object. In accordance with a determination that the distance between the electronic device and the physical object is increasing, a second virtual reality environment is displayed.

In some embodiments, the second virtual reality environment is a continuation of the previously-displayed virtual reality environment that is replaced by the visual representation of at least part of the physical environment. Displaying the second virtual reality environment can include replacing the entire visual representation of at least part of the physical environment with the second virtual reality environment. In some embodiments, at least one dimension of the second portal can be increased as the distance between the electronic device and the physical object increases.

Figure 7B:
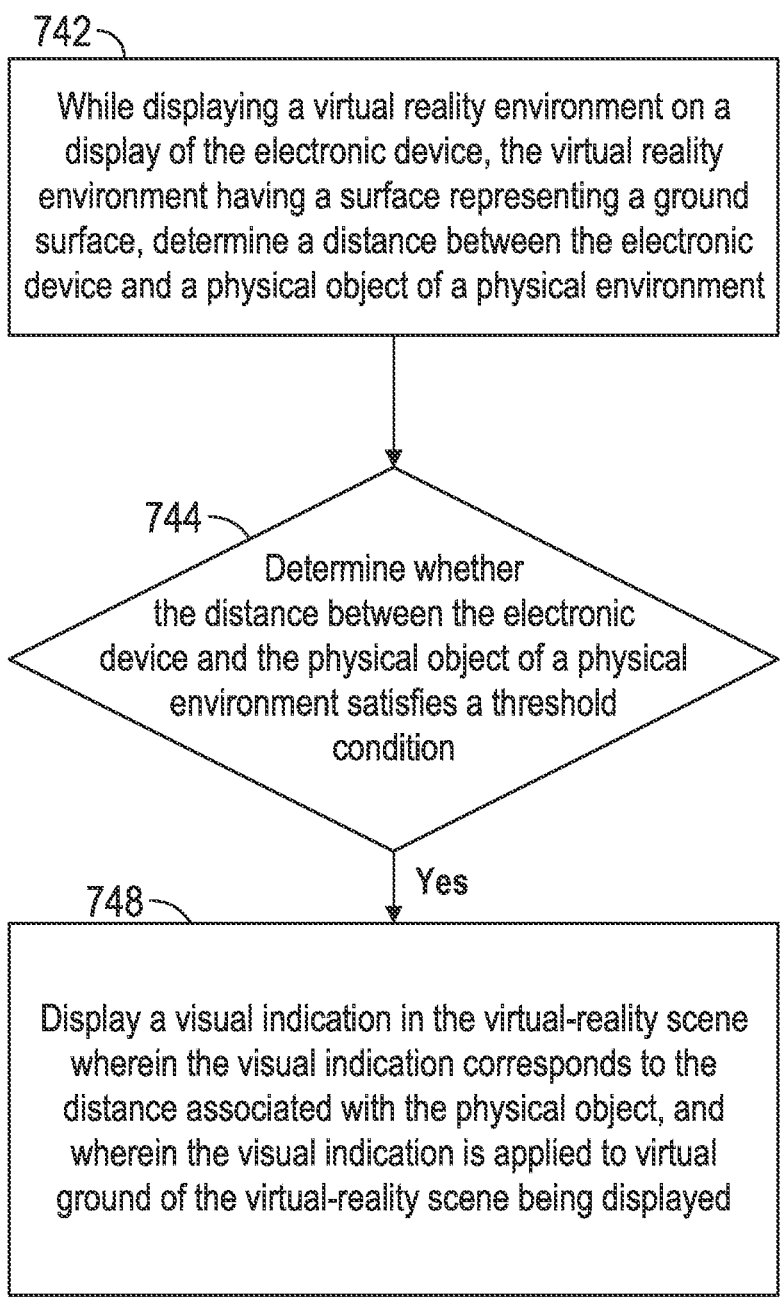

Turning now to FIG. 7B, a flow chart of exemplary process 740 for indicating physical obstacles in a virtual reality environment is illustrated. In the description below, process 740 is described as being performed using a user device (e.g., device 100a or 206). The user device is, for example, a handheld mobile device or a head-mounted device. It should be recognized that, in other embodiments, process 740 is performed using one or more electronic devices, such as a user device that is communicatively coupled to another device, such as a base device. In these embodiments, the operations of process 740 are distributed in any manner between the user device and the other device. Further, it should be appreciated that the display of the user device can be transparent or opaque. It should be appreciated that one or more blocks of process 740 can be optional and/or additional blocks can be performed.

At block 742, a virtual reality environment is displayed on a display of an electronic device and a distance between the electronic device and a physical object of a physical environment is determined. The electronic device is a virtual reality headset, a smartphone, or a tablet in some embodiments. The virtual reality environment has a surface representing a ground surface in some embodiments. At block 744, whether a distance between the electronic device and a physical object of a physical environment is within a threshold distance is determined. At block 748, in accordance with a determination that the distance is within the threshold distance, a visual effect is displayed in the virtual reality environment. In some embodiments, the visual effect corresponds to the distance associated with the physical object and is disposed on the ground surface of the virtual reality environment.

In some embodiments, an appearance of the visual effect applied to the virtual ground can vary based on the distance between the electronic device and the physical object. At least one dimension of the visual effect applied to the virtual ground is based on the size of the physical object. The visual effect applied to the virtual ground is a substantially triangular shaped-darkened area.

It should be recognized that while processes 700 and 740 are described with reference to virtual reality environments, processes 700 and 740 are not so limited. By way of example, in some instances processes 700 and 740 are implemented using augmented-reality environments. For example, one or more virtual objects, including, but not limited to, those used for visual effects, can be replaced with visual representations of physical objects in a physical environment.

The foregoing descriptions of specific embodiments have been presented for purposes of illustration and description. They are not intended to be exhaustive or to limit the scope of the claims to the precise forms disclosed, and it should be understood that many modifications and variations are possible in light of the above teaching.

What is claimed is:

1. An electronic device, comprising:
   one or more cameras;
   a memory;
   one or more processors operatively coupled to the memory; and
   computer-executable instructions stored in the memory and configured to be executed by the one or more processors, the computer-executable instructions including instructions for:
   displaying a virtual reality environment;
   determining a distance between the electronic device and a first physical object;
   determining a first type of the first physical object;
   determining whether the distance between the electronic device and the first physical object is within a first threshold distance, wherein the first threshold distance is based on the determined first type of the first physical object;
   in accordance with a determination that the distance is within the first threshold distance, displaying a visual effect in the virtual reality environment,
   determining whether the distance between the electronic device and the first physical object is within a second threshold distance;
   in accordance with a determination that the distance is within the second threshold distance, displaying a visual representation of at least part of a physical environment, the visual representation provided using the one or more cameras;
   determining a second distance between the electronic device and a second physical object;
   determining a second type of the second physical object, wherein the first type of the first physical object is different from the second type of the second physical object;
   determining whether the second distance between the electronic device and the second physical object is within a third threshold distance, wherein the third threshold distance is based on the determined second type of the second physical object, and wherein first threshold distance is different from the third threshold distance;
   in accordance with a determination that the second distance is within the third threshold distance, displaying the visual effect in the virtual reality environment;
   determining whether the second distance between the electronic device and the second physical object is within a fourth threshold distance; and
   in accordance with a determination that the second distance is within the fourth threshold distance, displaying a second visual representation of at least part of the physical environment, the second visual representation provided using the one or more cameras.

2. The electronic device of claim 1, wherein the second threshold distance is based on the type of the first physical object.

3. The electronic device of claim 1, wherein the type of the first physical object is associated with a risk level of the first physical object.

4. The electronic device of claim 1, wherein the electronic device is a wearable headset.

5. The electronic device of claim 1, wherein determining whether the distance between the electronic device and the first physical object is within the first threshold distance comprises:
   determining whether the electronic device is moving toward the first physical object in a physical environment.

6. The electronic device of claim 1, wherein at least one of the first threshold distance and the second threshold distance is based on speed of movement of the electronic device.

7. The electronic device of claim 1, wherein the computer-executable instructions further include instructions for:
   determining the first threshold distance and the second threshold distance based on the first physical object.

8. The electronic device of claim 1, wherein displaying the visual effect comprises:
   displaying one or more virtual objects in the virtual reality environment, wherein the one or more virtual objects is an indication that the first physical object is within the first threshold distance from the electronic device.

9. The electronic device of claim 8, wherein the computer-executable instructions further include instructions for:
   varying an appearance of at least one of the displayed one or more virtual objects based on the distance between the electronic device and the first physical object.

10. The electronic device of claim 1, wherein displaying the virtual reality environment comprises displaying a surface representing a ground surface, and wherein displaying the visual effect comprises:
    displaying a darkened area on the ground surface, wherein the darkened area corresponds to a location of the first physical object in a physical environment relative to the electronic device.

11. The electronic device of claim 10, wherein the computer-executable instructions further include instructions for:
    determining whether the electronic device is moving towards or moving away from the first physical object; and
    in accordance with a determination that the electronic device is moving towards the first physical object, darkening the darkened area based on the distance between the electronic device and the first physical object.

12. The electronic device of claim 11, wherein the computer-executable instructions further include instructions for:

in accordance with a determination that the electronic device is moving away from the first physical object, lightening the darkened area.

13. The electronic device of claim 10, wherein a dimension of the darkened area corresponds to a size of the first physical object.

14. The electronic device of claim 1, wherein determining whether the distance between the electronic device and the first physical object in the physical environment is within the second threshold distance comprises:
   determining whether the electronic device is moving toward the first physical object; and
   in accordance with a determination that the electronic device is moving toward the first physical object, determining whether the distance between the electronic device and the first physical object of the physical environment is less than or equal to the second threshold distance.

15. The electronic device of claim 1, wherein the visual effect corresponds to the distance associated with the first physical object.

16. A non-transitory computer-readable storage medium storing one or more programs configured to be executed by one or more processors of an electronic device with one or more cameras, the one or more programs including instructions for:
   displaying a virtual reality environment;
   determining a distance between the electronic device and a first physical object;
   determining a first type of the first physical object;
   determining whether the distance between the electronic device and the first physical object is within a first threshold distance, wherein the first threshold distance is based on the determined first type of the first physical object;
   in accordance with a determination that the distance is within the first threshold distance, displaying a visual effect in the virtual reality environment;
   determining whether the distance between the electronic device and the first physical object is within a second threshold distance;
   in accordance with a determination that the distance is within the second threshold distance, displaying a visual representation of at least part of a physical environment, the visual representation provided using the one or more cameras;
   determining a second distance between the electronic device and a second physical object;
   determining a second type of the second physical object, wherein the first type of the first physical object is different from the second type of the second physical object;
   determining whether the second distance between the electronic device and the second physical object is within a third threshold distance, wherein the third threshold distance is based on the determined second type of the second physical object, and wherein first threshold distance is different from the third threshold distance;
   in accordance with a determination that the second distance is within the third threshold distance, displaying the visual effect in the virtual reality environment;
   determining whether the second distance between the electronic device and the second physical object is within a fourth threshold distance; and
   in accordance with a determination that the second distance is within the fourth threshold distance, displaying a second visual representation of at least part of the physical environment, the second visual representation provided using the one or more cameras.

17. A method for indicating physical obstacles while displaying a virtual reality environment, the method comprising:
   at an electronic device with one or more processors, memory, and one or more cameras:
   displaying a virtual reality environment;
   determining a distance between the electronic device and a first physical object;
   determining a first type of the first physical object;
   determining whether the distance between the electronic device and the first physical object is within a first threshold distance, wherein the first threshold distance is based on the determined first type of the first physical object;
   in accordance with a determination that the distance is within the first threshold distance displaying a visual effect in the virtual reality environment;
   determining whether the distance between the electronic device and the first physical object is within a second threshold distance;
   in accordance with a determination that the distance is within the second threshold distance, displaying a visual representation of at least part of a physical environment, the visual representation provided using the one or more cameras;
   determining a second distance between the electronic device and a second physical object;
   determining a second type of the second physical object, wherein the first type of the first physical object is different from the second type of the second physical object;
   determining whether the second distance between the electronic device and the second physical object is within a third threshold distance, wherein the third threshold distance is based on the determined second type of the second physical object, and wherein first threshold distance is different from the third threshold distance;
   in accordance with a determination that the second distance is within the third threshold distance, displaying the visual effect in the virtual reality environment;
   determining whether the second distance between the electronic device and the second physical object is within a fourth threshold distance; and
   in accordance with a determination that the second distance is within the fourth threshold distance, displaying a second visual representation of at least part of the physical environment, the second visual representation provided using the one or more cameras.

* * * * *

UNITED STATES PATENT AND TRADEMARK OFFICE
CERTIFICATE OF CORRECTION

| | | |
|---|---|---|
| PATENT NO. | : 11,734,867 B2 | Page 1 of 1 |
| APPLICATION NO. | : 17/479489 | |
| DATED | : August 22, 2023 | |
| INVENTOR(S) | : Seyedkoosha Mirhosseini et al. | |

It is certified that error appears in the above-identified patent and that said Letters Patent is hereby corrected as shown below:

In the Claims

In Claim 1, Column 23, Line 42, delete "environment," and insert -- environment; --.

In Claim 17, Column 26, Line 25, delete "distance" and insert -- distance, --.

Signed and Sealed this
Thirteenth Day of February, 2024

*Katherine Kelly Vidal*

Katherine Kelly Vidal
*Director of the United States Patent and Trademark Office*